(12) United States Patent
Pedamalli et al.

(10) Patent No.: US 12,021,665 B2
(45) Date of Patent: Jun. 25, 2024

(54) METHODS AND WIRELESS NETWORK FOR SELECTING PILOT PATTERN FOR OPTIMAL CHANNEL ESTIMATION

(71) Applicant: SAMSUNG ELECTRONICS CO., LTD., Suwon-si (KR)

(72) Inventors: Saikrishna Pedamalli, Karnataka (IN); Ashok Kumar Reddy Chavva, Karnataka (IN); Mukul Beniwal, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 171 days.

(21) Appl. No.: 17/745,017

(22) Filed: May 16, 2022

(65) Prior Publication Data
US 2022/0376955 A1    Nov. 24, 2022

(30) Foreign Application Priority Data

May 18, 2021   (IN) .............................. 202141022302
Apr. 29, 2022   (IN) .............................. 202141022302

(51) Int. Cl.
H04L 25/02    (2006.01)
(52) U.S. Cl.
CPC ...... *H04L 25/0228* (2013.01); *H04L 25/0226* (2013.01)
(58) Field of Classification Search
CPC .................................................. H04L 25/0228
See application file for complete search history.

(56) References Cited

U.S. PATENT DOCUMENTS

| 2009/0052518 A1* | 2/2009 | Iwagami | H04L 25/0212 375/240 |
| 2009/0257519 A1 | 10/2009 | Lin et al. | |
| 2013/0034177 A1* | 2/2013 | Lee | H04L 25/0204 375/267 |
| 2014/0192744 A1* | 7/2014 | Zhou | H04W 72/54 370/329 |
| 2019/0013914 A1 | 1/2019 | Xu et al. | |

FOREIGN PATENT DOCUMENTS

| CN | 101682607 | 3/2010 |
| CN | 108702271 | 2/2021 |

OTHER PUBLICATIONS

Indian Office Action issued Dec. 2, 2022 in corresponding Indian Patent Application No. 202141022302.

* cited by examiner

*Primary Examiner* — Zhiren Qin
(74) *Attorney, Agent, or Firm* — Nixon & Vanderhye P.C.

(57) ABSTRACT

Embodiments herein disclose a method for selecting a pilot pattern for an optimal channel estimation in a wireless network by a UE. The method includes: receiving a specified pilot pattern from a base station (BS); determining at least one channel parameter from the received specified pilot pattern, wherein the at least one channel parameter comprises a delay, a Doppler, a Demodulation Reference Signal (DMRS), a sounding reference signal (SRS), and a signal to noise ratio (SNR); estimating a minimum number of pilots required using the at least one determined channel parameter; and determining an optimal pilot pattern using a channel coefficient and the estimated minimum number of pilots, wherein the optimal pilot pattern is used for the optimal channel estimation.

16 Claims, 22 Drawing Sheets

METHODS AND WIRELESS NETWORK FOR SELECTING PILOT PATTERN FOR OPTIMAL CHANNEL ESTIMATION

CROSS-REFERENCE TO RELATED APPLICATIONS

This application is based on and claims priority under 35 U.S.C. § 119 to Indian Provisional Patent Application No. 202141022302, filed on May 18, 2021, in the Indian Patent Office, and to Indian Non-Provisional Patent Application No. 202141022302, filed on Apr. 29, 2022, in the Indian Patent Office, the disclosures of which are incorporated by reference herein in their entireties.

BACKGROUND

Field

The disclosure relates to wireless networks, and more particularly to performing optimum channel estimation in the wireless networks.

Description of Related Art

In a wireless communication channel, a received signal is distorted by a channel. In order to address the channel distortion and recover transmitted symbols, the channel needs to be estimated and compensated at a receiver. In order to estimate a channel response, a wireless network may transmit reference signals, at predefined locations, called as pilots. But the channel characteristics are not static and vary quite a bit. So, a limited set of predefined pilot patterns may not be sufficient to optimally estimate the channel with least number of pilots required.

Uniformly spaced pilot scheme (S100) has been used as per fourth generation Long-Term Evolution (4G LTE) protocol for the channel estimation (as depicted in FIG. 1A). A non-uniform pilot scheme (S200) can better represent the channel in conditions of low signal to noise ratio (SNR) as opposed to fixed pattern (as depicted in FIG. 1B). Deep Learning networks like Auto-encoders have been used effectively for feature selection and extraction. The problem of finding the most informative pilot positions can be formulated as a feature selection problem. Thus, a downlink (DL) network is used to find near optimum pilot positions for a channel model on a wide range of channel parameters such as SNR and Doppler.

FIG. 3A is a diagram including a graph (S300a) of a channel coefficients versus delay spread (DS). The absolute value of channel coefficients plotted for different DS values in a frequency domain. For plots, a user of the wireless network used 20 RBs and 10 slots. It can be observed that the for higher delay spread the channel coefficients vary rapidly. This shows that higher the delay spread values, the density of pilots in frequency domain (per symbol) should be more as well.

FIG. 3B is a diagram including a graph (S300b) of a channel coefficients versus Doppler spread (DoS). The absolute value of channel coefficients plotted for different DoS values in time domain. For plots, a user of the wireless network used 20 RBs and 10 slots. It can be observed that for higher Doppler spread the channel coefficients vary rapidly. This shows that higher the Doppler spread values, the density of pilots in time domain (per frequency tone) should be more as well.

Thus, it is desired to address the above mentioned disadvantages or other shortcomings or at least provide a useful alternative.

SUMMARY

Embodiments of the disclosure provide methods and a wireless network for selecting a pilot pattern for an optimal channel estimation.

Embodiments of the disclosure identify a minimum number of pilots and their respective positions while maintaining a channel estimation error below a given threshold.

Embodiments of the disclosure send, by a UE, information regarding pilot positioning to a base station (BS).

Embodiments of the disclosure provide a communication between the UE and the BS and vice versa in an encoded format for the pilot positioning.

Embodiments of the disclosure provide a DL based network to find the minimum number of pilot positions for a particular channel type and a fixed error limit (NMSE).

Embodiments of the disclosure use an auto-encoder Network to find the best possible pilot locations using stochastic combinations of all variations and evaluating to get improved channel estimation results.

Accordingly, example embodiments herein provide a method for selecting a pilot pattern for an optimal channel estimation. The method includes: receiving, by a UE, a specified pilot pattern from a base station (BS; determining, by the UE, at least one channel parameter from the received specified pilot pattern, wherein the at least one channel parameter comprises a delay, a Doppler, a Demodulation Reference Signal (DMRS), a sounding reference signal (SRS), and a signal to noise ratio (SNR; estimating, by the UE, a minimum number of pilots required using the at least one determined channel parameter; and determining, by the UE, an optimal pilot pattern using a channel coefficient and the estimated minimum number of pilots, wherein the optimal pilot pattern is used for the optimal channel estimation.

In an example embodiment, the method further includes: identifying, by the UE, a position of a pilot in the optimal pilot pattern based on the computed channel parameter, the estimated minimum number of pilots, and an acceptable error threshold value; and transmitting, by the UE, the optimal pilot pattern and the position of the pilot in the optimal pilot pattern to the BS.

In an example embodiment, the method further includes: determining, by the UE, whether a number of continuous resource blocks (RBs) used for communication by the BS is identified apriori; and performing, by the UE, one of: transmitting the optimal pilot pattern for the fixed number of RBs upon determining the number of continuous RBs used for communication by the BS is identified apriori, and transmitting multiple patterns with different RB setup to the BS upon determining the number of continuous RBs used for communication by the BS is not identified apriori.

In an example embodiment, the method further includes: receiving, by the UE, at least one another channel parameter; determining, by the UE, whether at least one another channel parameter and the at least one channel parameter are same, wherein the at least one channel parameter is received at a first time period and the at least one another channel parameter is received at a second time period, wherein the first time period and the second time period are different; and performing, by the UE, one of: using the optimal pilot pattern for the channel estimation upon determining that at least one another channel parameter and the at least one channel parameter are same, and repeating steps of estimating the minimum number of pilots required using the at least one another channel parameter, selecting another optimal pilot pattern using the channel coefficient and the estimated minimum number of pilots, and transmitting the optimal pilot pattern to the BS upon determining that at least one another channel parameter and the at least one channel parameter are different.

In an example embodiment, transmitting the optimal pilot pattern to the BS includes performing, by the UE, one of transmitting an actual subcarrier and a symbol number to the BS, and transmitting a first position using actual subcarrier, remaining positions using differential subcarrier and symbol numbers to the BS.

In an example embodiment, the position of the pilot is determined using a feature selection network. The feature selection network is configured to receive the minimum number of pilots and channel coefficients to determine the position of the pilot. The feature selection network comprises: an encoder block configured to convert a high dimension signal into a low dimension signal, a decoder block configured to reconvert the lower dimension signal to the high dimension signal, and a selector layer configured to generate a stochastic linear combinations of input features received at the encoder block, wherein the feature selection network is trained to update the stochastic linear combinations of the selector layer and weights and biases of the decoder block by minimizing error between ideal channel coefficients and a decoder output.

In an example embodiment, the optimal number of pilots is determined using a regression network, wherein the regression network receives the at least one channel parameters, an acceptable error threshold value, and a number of continuous RBs to determine the optimal number of pilots, wherein the optimal pilot pattern is determined using nearest neighbour of the channel parameter.

In an example embodiment, the optimal pilot pattern and the position of the pilot in the optimal pilot pattern is transmitted in an encoded format, wherein the UE requires at least one decoder information for the channel estimation.

Accordingly, the various example embodiments herein provide methods for selecting a pilot pattern for an optimum channel estimation. The method includes receiving, by a base station, a compressed channel and at least one of a channel parameter, a Channel State Information (CSI) and a channel quality indicator (CQI) from a user equipment (UE). Further, the method includes determining, by the base station, the optimal pilot pattern based on the compressed channel and at least one of the channel parameter, the CSI and the CQI, wherein the optimal pilot pattern is used for optimum channel estimation.

In an example embodiment, the method further includes: receiving, by the base station, another compressed channel and at least one of another channel parameter, another CSI and another CQI from the UE, based on the UE detecting the estimation error; and repeating determining, by the base station, the optimal pilot pattern based on the another compressed channel and at least one of the another channel parameter, the another CSI and the another CQI.

Accordingly, example embodiments herein provide a UE for selecting a pilot pattern for an optimal channel estimation. The UE includes: an optimal channel estimation controller coupled with a processor and a memory. The optimal channel estimation controller is configured to: receive a specified pilot pattern from a BS; determine at least one channel parameter from the received predefined pilot pattern, wherein the at least one channel parameter comprises a delay, a Doppler, a DMRS, a SRS, and a SNR; estimate a minimum number of pilots required using the at least one determined channel parameter; and determine an optimal pilot pattern using a channel coefficient and the estimated minimum number of pilots, wherein the optimal pilot pattern is used for the optimal channel estimation.

Accordingly, example embodiments herein provide a base station configured to select a pilot pattern for an optimum channel estimation. The base station includes: an optimal channel estimation controller coupled with a processor and a memory. The optimal channel estimation controller is configured to: receive a compressed channel and at least one of a channel parameter, a CSI and a CQI from a UE; and determine the optimal pilot pattern based on the compressed channel and at least one of the channel parameter, the CSI and the CQI, wherein the optimal pilot pattern is used for optimum channel estimation.

Accordingly, example embodiments herein provide a wireless network for selecting a pilot pattern for an optimal channel estimation. The wireless network includes a UE and a BS. The UE is configured to send a reference signal with a pilot pattern to the BS at a first time instance. The BS is configured to receive the reference signal with the pilot pattern from the UE, estimate an optimal pilot pattern for a channel parameter received in the pilot pattern, and encode and send the optimal pilot pattern to the UE.

In an example embodiment, the BS is configured to: determine that a channel parameter received in the pilot pattern is changed at a second time instance; send an interrupt signal to the UE based on the determination and receive another reference signal with another pilot pattern from the UE based on the interrupt signal; and estimate another optimal pilot pattern for another channel parameter received in another pilot pattern and encode and send another optimal pilot pattern to the UE.

These and other aspects of the various example embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF THE DRAWINGS

The embodiments disclosed herein are illustrated in the accompanying drawings, throughout which like reference letters indicate corresponding parts in the various figures. Further, the above and other aspects, features and advantages of certain embodiments of the present disclosure will be more apparent from the following detailed description, taken in conjunction with the accompanying drawings, in which.

DETAILED DESCRIPTION

Figure 1:
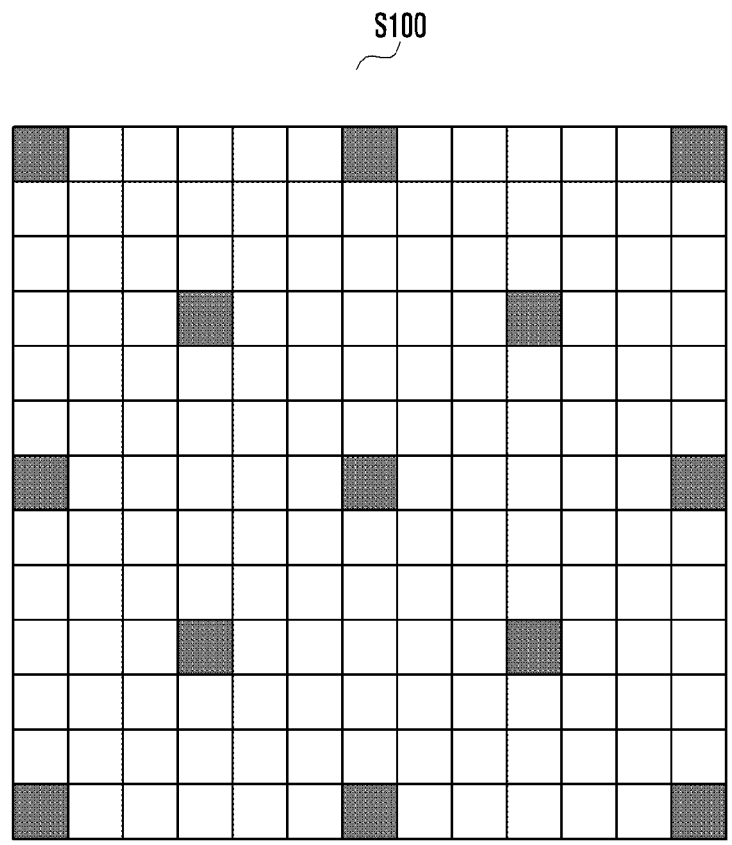
FIG. 1 and FIG. 2 are diagrams illustrating examples of uniform and non-uniform pilot schemes respectively, according to the prior art.
Figure 2:
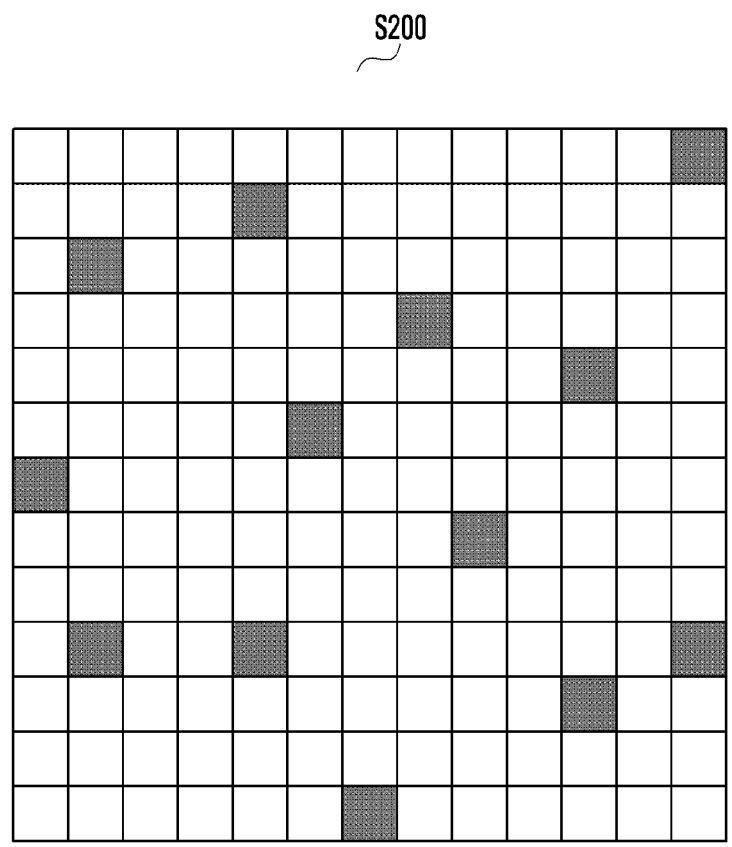
Figure 3A:
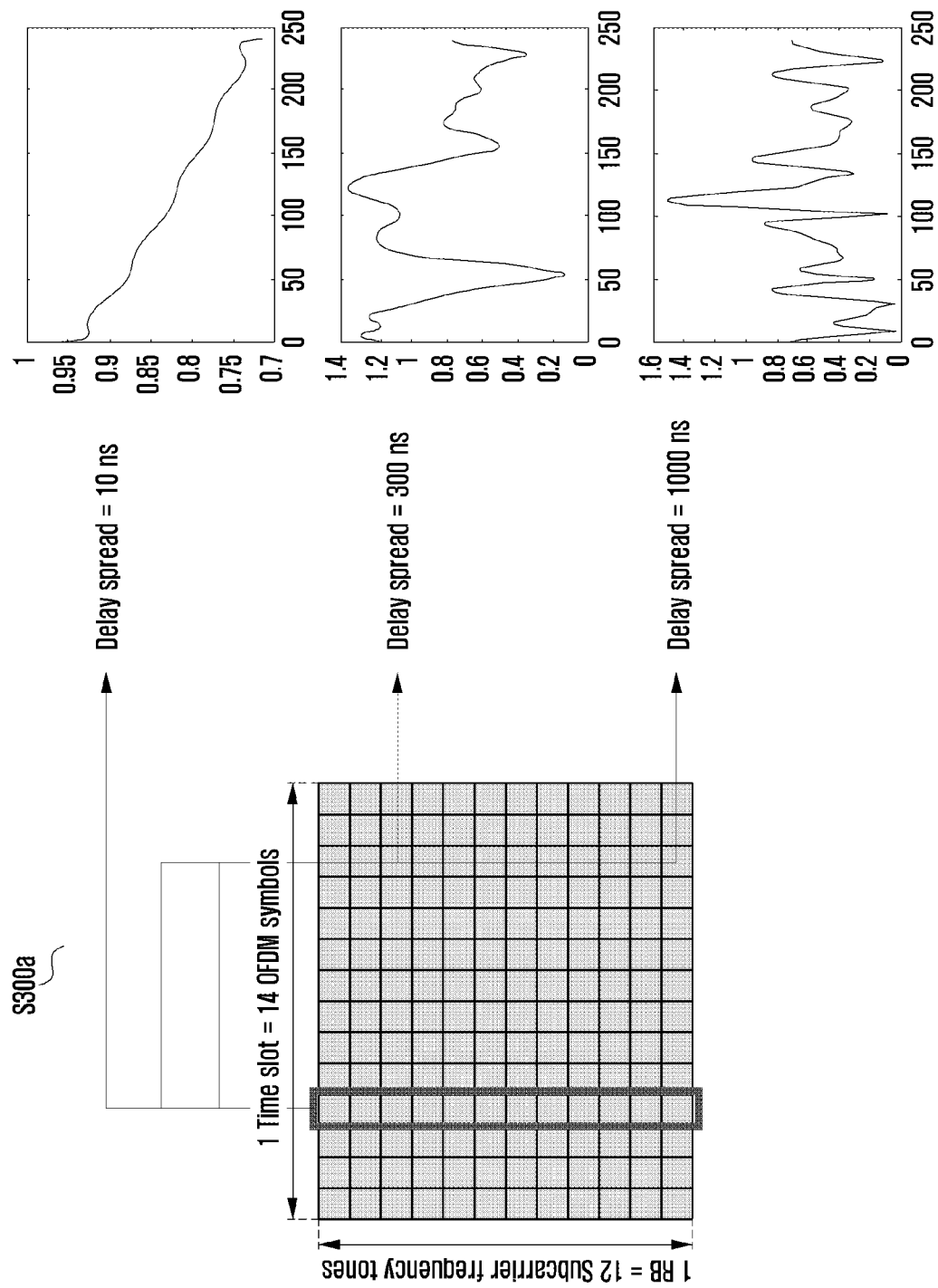
FIG. 3A is a diagram including a graph of a channel coefficients versus DS.
Figure 3B:
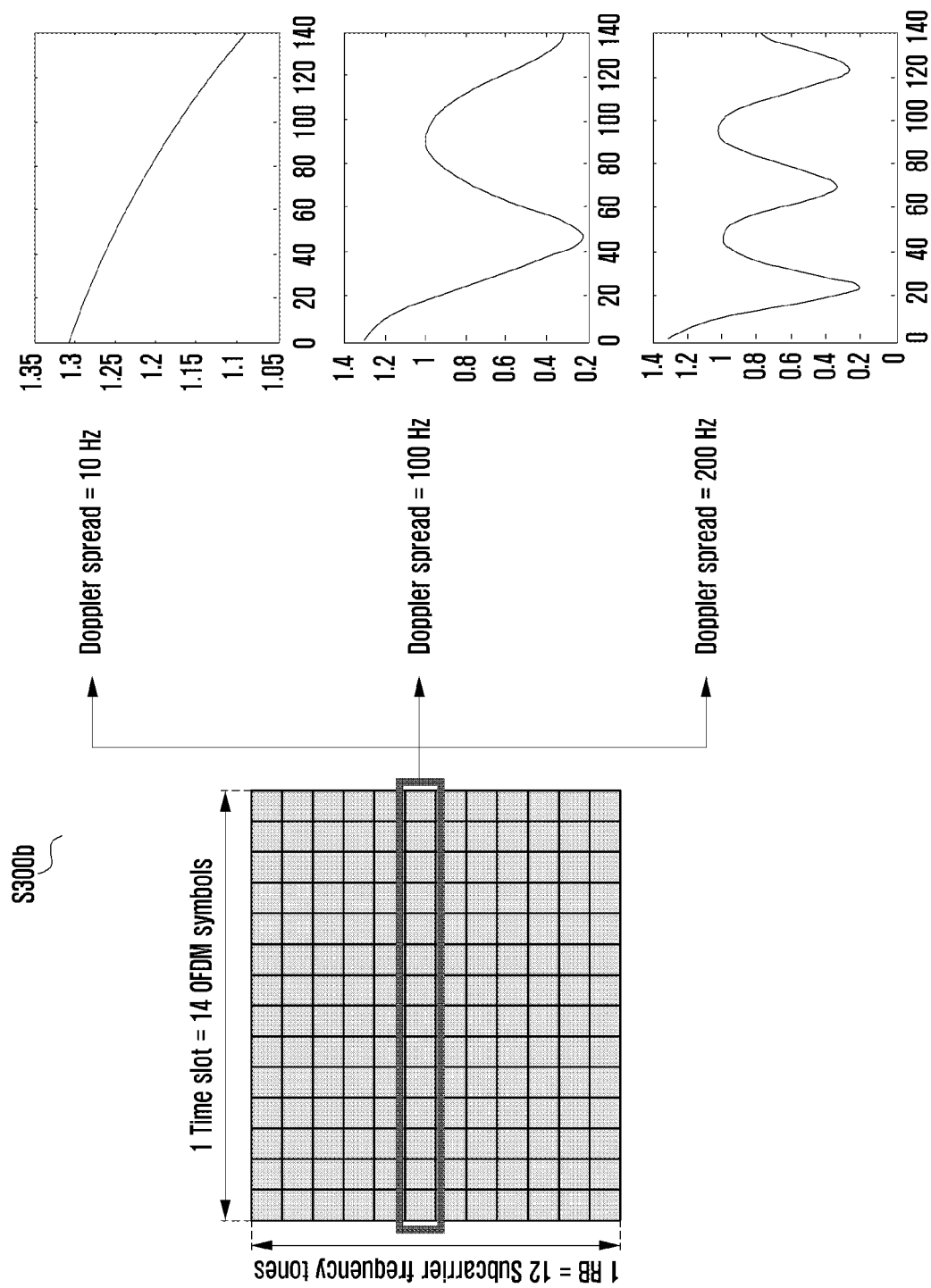
FIG. 3B is a diagram including a graph of a channel coefficients versus DoS.

The various example embodiments disclosed herein and the various features and advantageous details thereof are explained more fully with reference to the non-limiting example embodiments that are illustrated in the accompanying drawings and detailed in the following disclosure. Descriptions of well-known components and processing techniques may be omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Embodiments herein disclose a method for selecting a pilot pattern for an optimal channel estimation. The method includes receiving, by a UE, a predefined pilot pattern from a BS. Further, the method includes determining, by the UE, at least one channel parameter from the received predefined pilot pattern, wherein the at least one channel parameter comprises a delay, a Doppler, a DMRS, a SRS, and a SNR. Further, the method includes estimating, by the UE, a minimum number of pilots required using the at least one determined channel parameter. Further, the method includes determining, by the UE, an optimal pilot pattern using a channel coefficient and the estimated minimum number of pilots, wherein the optimal pilot pattern is used for the optimal channel estimation.

In the existing setup, the pilots are communicated between base station (BS) and user equipment (UE) in one among the predefined patterns with respect to a $3^{rd}$ Generation Partnership Project (3GPP) specification, which is uniform. This may not be ideal positioning for the pilots for optimal channel estimation using learning based techniques going forward. Unlike conventional method, the disclosed method can be used to estimate the optimal pilot number and their respective positioning for better channel estimation resulting in higher throughput. This can be done either at the BS or the UE using uplink and downlink channels respectively using feature selection techniques.

The disclosed method reduces overhead using only optimum number of pilot positions in the resource block. The disclosed method provides an improved channel estimation as opposed to fixed uniform pilot schemes. The disclosed method can be used to estimate the channel in a better manner using non-uniform Pilot pattern depending on channel properties and provides a better performance with lesser number of pilots in low SNR ranges.

Referring now to the drawings, and more particularly to FIGS. 4A through 15, where similar reference characters denote corresponding features consistently throughout the figures, there are shown various example embodiment(s).

Figure 4A:
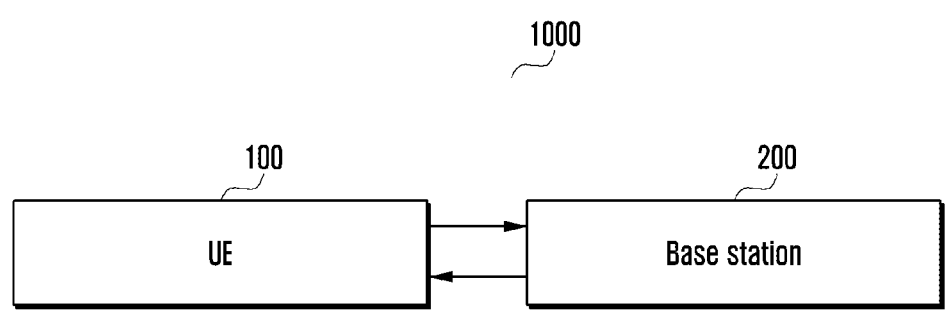
FIG. 4A is a block diagram illustrating an example configuration of a wireless network for a deep learning based optimal pilot pattern selection for a channel estimation, according to various embodiments.

FIG. 4A is a block diagram illustrating an example configuration of a wireless network (1000) for a deep learning based optimal pilot pattern selection for a channel estimation, according to various embodiments. The wireless network (1000) includes a UE (100) and a base station (200). The wireless network (1000) can be, for example, but not limited to a 4G network, a 5G network, a 6G network, an open radio access network (ORAN) network or the like. The UE (100) can be, for example, but not limited to a laptop, a desktop computer, a notebook, a Device-to-Device (D2D) device, a vehicle to everything (V2X) device, a smartphone, a foldable phone, a smart TV, a tablet, an immersive device, and an internet of things (IoT) device.

Figure 7:
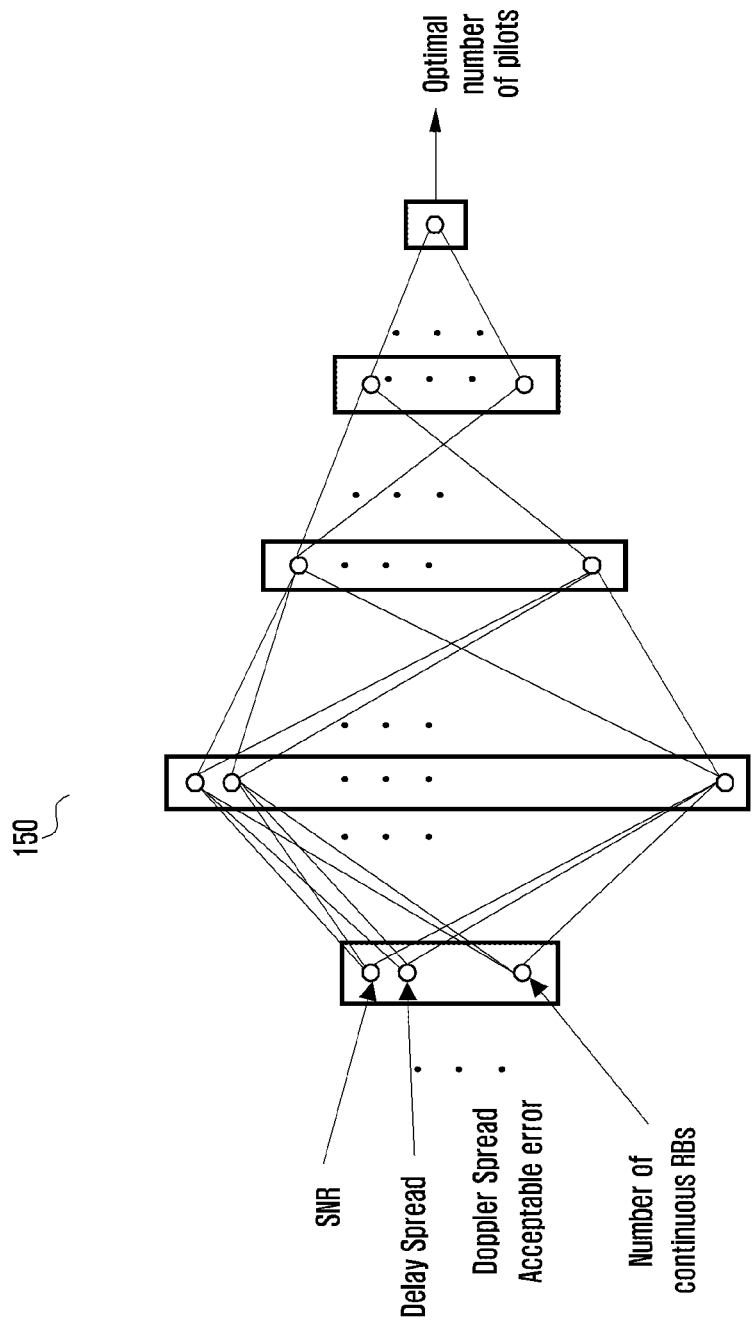
FIG. 7 is a diagram illustrating an optimal pilot number NN as a regression network, according to various embodiments.

The UE (100) receives a predefined (e.g., specified) pilot pattern from the base station (200). Further, the UE (100) determines at least one channel parameter from the received predefined pilot pattern and estimates the minimum number of pilots required using the at least one determined channel parameter. The channel parameter can be, for example, but not limited to a delay, a Doppler, a DMRS, a SRS, and a SNR. Further, the UE (100) determines the optimal pilot pattern using the channel coefficient and the estimated minimum number of pilots. The optimal pilot pattern is used for the optimal channel estimation. In an embodiment, the optimal number of pilots is determined using a regression network (150) (as shown in FIG. 7), wherein the regression network (150) receives the at least one channel parameters, an acceptable error threshold value, and a number of continuous RBs to determine the optimal number of pilots. The optimal pilot pattern is determined using nearest neighbour of the channel parameter.

Figure 8:
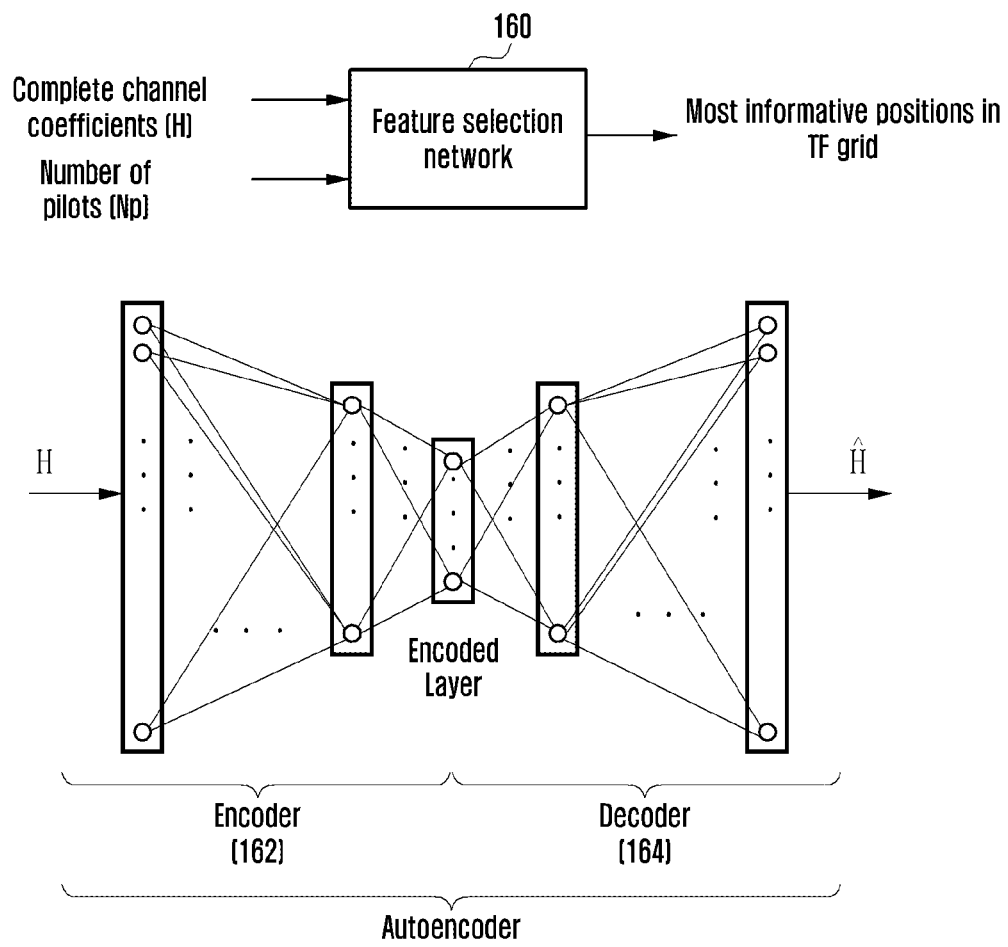
FIG. 8 is a diagram illustrating an optimal pilot position using a feature selection network, according to various embodiments.

Further, the UE (100) identifies the position of a pilot in the optimal pilot pattern based on the computed channel parameter, the estimated minimum number of pilots, and an acceptable error threshold value. In an embodiment, the position of the pilot is determined using a feature selection network (160) (as shown in FIG. 8). The feature selection network (160) receives the minimum number of pilots and channel coefficients to determine the position of the pilot. Further, the UE (100) transmits the optimal pilot pattern and the position of the pilot in the optimal pilot pattern to the base station (200).

In an embodiment, the UE (100) determines whether a number of continuous RBs used for communication by the BS (200) is identified apriori. Upon determining the number of continuous RBs used for communication by the BS (200) is identified apriori, the UE (100) transmits the optimal pilot pattern for the fixed number of RBs. Upon determining the number of continuous RBs used for communication by the BS (200) is not identified apriori, the UE (100) transmits multiple patterns with different RB setup to the BS (200).

Further, the UE (100) receives at least one another channel parameter. Further, the UE (100) determines whether at least one another channel parameter and the at least one channel parameter are same. The at least one channel parameter is received at the first time period and the at least one another channel parameter is received at a second time period. The first time period and the second time period are different.

Upon determining that at least one another channel parameter and the at least one channel parameter are same, the UE (100) uses the optimal pilot pattern for the channel estimation. Upon determining that at least one another channel parameter and the at least one channel parameter are different, the UE (100) repeats steps of estimating the minimum number of pilots required using the at least one another channel parameter, selecting another optimal pilot pattern using the channel coefficient and the estimated minimum number of pilots, and transmitting the optimal pilot pattern to the BS (200).

The base station (200) receives the compressed channel and at least one of a channel parameter, a CSI and a CQI from the UE (100). Further, the base station (200) determines the optimal pilot pattern based on the compressed channel and at least one of the channel parameter, the CSI and the CQI, wherein the optimal pilot pattern is used for optimum channel estimation.

Further, the base station (200) receives another compressed channel and at least one of another channel parameter, another CSI and another CQI from the UE (100), when the UE (100) detects the estimation error. Further, the base station (200) repeats steps of determine the optimal pilot pattern based on the another compressed channel and at least one of the another channel parameter, the another CSI and the another CQI.

Figure 4B:
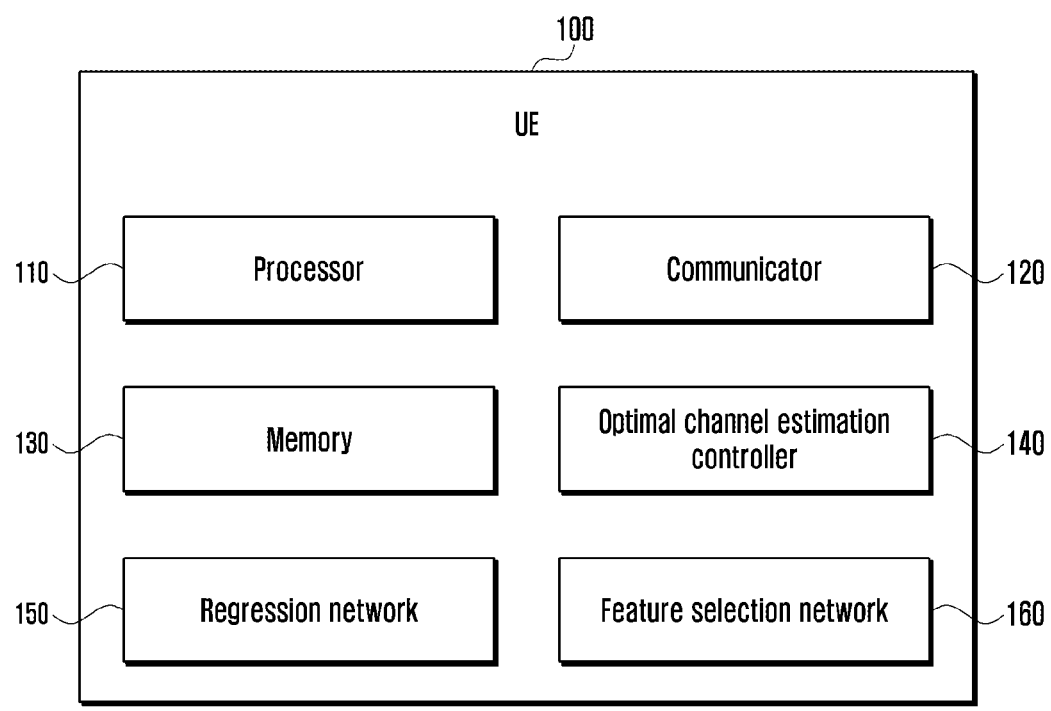
FIG. 4B is a block diagram illustrating an example configuration of a UE, according to various embodiments.

FIG. 4B is a block diagram illustrating an example configuration of the UE (100), according to various embodiments. In an embodiment, the UE (100) includes a processor (e.g., including processing circuitry) (110), a communicator (e.g., including communication circuitry) (120), a memory (130), an optimal channel estimation controller (e.g., including various processing circuitry and/or executable program instructions) (140), the regression network (150) and the feature selection network (160). The processor (110) is coupled with the communicator (120), the memory (130), the optimal channel estimation controller (140), the regression network (150) and the feature selection network (160).

The optimal channel estimation controller (140) receives the predefined pilot pattern from the base station (200). Further, the optimal channel estimation controller (140) determines the channel parameter from the received predefined pilot pattern and estimates the minimum number of pilots required using the at least one determined channel parameter. Further, the optimal channel estimation controller (140) determines the optimal pilot pattern using the channel coefficient and the estimated minimum number of pilots. The optimal pilot pattern is used for the optimal channel estimation. In an embodiment, the optimal number of pilots is determined using the regression network (150) (as shown in FIG. 7).

Further, the optimal channel estimation controller (140) identifies the position of the pilot in the optimal pilot pattern based on the computed channel parameter, the estimated minimum number of pilots, and an acceptable error threshold value. In an embodiment, the position of the pilot is determined using the feature selection network (160) (as shown in FIG. 8). Further, the optimal channel estimation controller (140) transmits the optimal pilot pattern and the position of the pilot in the optimal pilot pattern to the base station (200).

In an embodiment, the optimal channel estimation controller (140) determines whether the number of continuous RBs used for communication by the BS (200) is identified apriori. Upon determining the number of continuous RBs used for communication by the BS (200) is identified apriori, the optimal channel estimation controller (140) transmits the optimal pilot pattern for the fixed number of RBs. Upon determining the number of continuous RBs used for communication by the BS (200) is not identified apriori, the optimal channel estimation controller (140) transmits multiple patterns with different RB setup to the BS (200).

Further, the optimal channel estimation controller (140) receives at least one another channel parameter. Further, the optimal channel estimation controller (140) determines whether at least one another channel parameter and the at least one channel parameter are same. The at least one channel parameter is received at the first time period and the at least one another channel parameter is received at the second time period. The first time period and the second time period are different.

Upon determining that at least one another channel parameter and the at least one channel parameter are same, the optimal channel estimation controller (140) uses the optimal pilot pattern for the channel estimation. Upon determining that at least one another channel parameter and the at least one channel parameter are different, the optimal channel estimation controller (140) repeats steps of estimating the minimum number of pilots required using the at least one another channel parameter, selecting another optimal pilot pattern using the channel coefficient and the estimated minimum number of pilots, and transmitting the optimal pilot pattern to the BS (200).

The optimal channel estimation controller (140) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Further, at least one of the pluralities of modules/controller may be implemented through the AI model using a data driven controller (not shown). The data driven controller can be a ML model based controller and AI model based controller. A function associated with the AI model may be performed through the non-volatile memory, the volatile memory, and the processor (110). The processor (110) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning may refer, for example, to a predefined operating rule or AI model of a desired characteristic being made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 4B shows various hardware components of the UE (100) it is to be understood that various embodiments are not limited thereon. In various embodiments, the electronic device UE (100) may include less or more number of components. Further, the labels or names of the components are used only for illustrative purpose and does not limit the scope of the disclosure. One or more components can be combined together to perform same or substantially similar function in the UE (100).

Figure 4C:
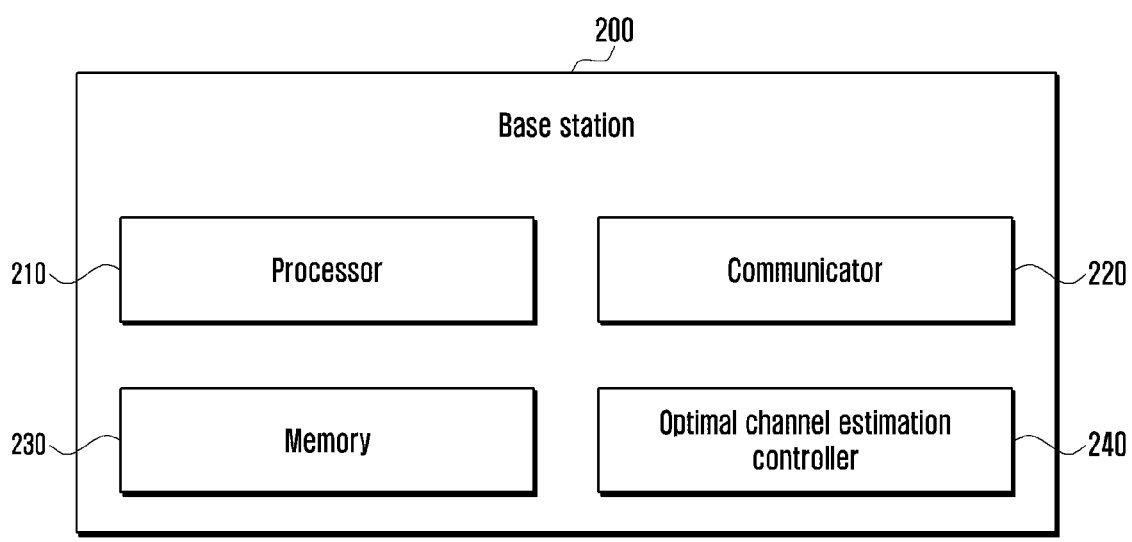
FIG. 4C is a block diagram illustrating an example configuration of a base station, according to various embodiments.

FIG. 4C is a block diagram illustrating an example configuration of the base station (200), according to various embodiments. In an embodiment, the base station (200) includes a processor (e.g., including processing circuitry) (210), a communicator (e.g., including communication circuitry) (220), a memory (230), and an optimal channel estimation controller (e.g., including various processing circuitry and/or executable program instructions) (240). The processor (210) is coupled with the communicator (220), the memory (230), and the optimal channel estimation controller (240). The optimal channel estimation controller (240) receives the compressed channel and the channel parameter, the CSI and the CQI from the UE (100). Further, the optimal channel estimation controller (240) determines the optimal pilot pattern based on the compressed channel and the channel parameter, the CSI and the CQI, wherein the optimal pilot pattern is used for optimum channel estimation.

Further, the optimal channel estimation controller (240) receives another compressed channel and at least one of another channel parameter, another CSI and another CQI from the UE (100), when the UE (100) detects the estimation error. Further, the optimal channel estimation controller (240) repeats steps of determine the optimal pilot pattern based on the another compressed channel and at least one of the another channel parameter, the another CSI and the another CQI.

The optimal channel estimation controller (240) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Further, at least one of the pluralities of modules/controller may be implemented through the AI model using a data driven controller (not shown). The data driven controller can be a ML model based controller and AI model based controller. A function associated with the AI model may be performed through the non-volatile memory, the volatile memory, and the processor (210). The processor (210) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning may refer, for example, to a predefined operating rule or AI model of a desired characteristic being made by applying a learning algorithm to a plurality of learning data. The learning may be performed in a device itself in which AI according to an embodiment is performed, and/or may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 4C shows various hardware components of the base station (200) it is to be understood that various embodiments are not limited thereon. In various embodiments, the base station (200) may include less or more number of components. Further, the labels or names of the components are used only for illustrative purpose and does not limit the scope of the disclosure. One or more components can be combined together to perform same or substantially similar function in the base station (200).

Figure 4D:
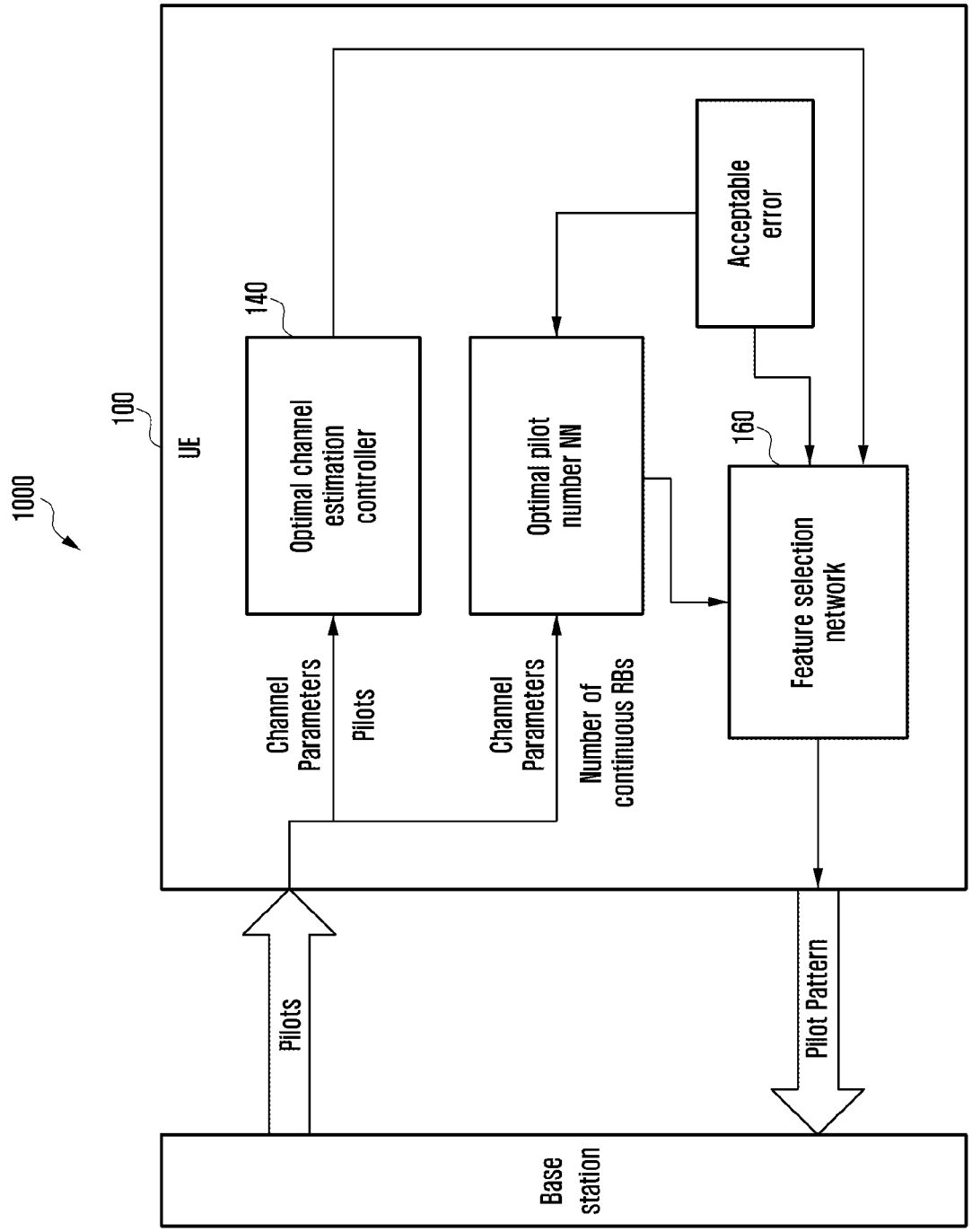
FIG. 4D is a diagram illustrating the wireless network for the deep learning based optimal pilot pattern selection for the channel estimation when preceding and current channel parameters are within a threshold and a best pilot pattern for these parameters is not communicated to the base station (BS), according to various embodiments.

FIG. 4D is a diagram illustrating an example of the wireless network (1000) for deep learning based optimal pilot pattern selection for the channel estimation when preceding and current channel parameters are within the threshold and the best pilot pattern for these parameters is not communicated to the base station (BS) (200), according to various embodiments.

This scenario is when previous (time T) and current (time T+1) channel parameters are within the prefixed threshold and the pilot pattern is not communicated apriori (channel parameters at time instances T−1 and T are beyond threshold). In this case, using the channel parameters and number of continuous RBs and max acceptable channel estimation error, the UE (100) first estimates the optimal number of pilots required for channel estimation. Using this optimal pilot number, the acceptable CE error and the estimated channel, the UE (100) obtains the best pilot pattern with the help of feature selection technique. This is then communicated to the BS (200) from the UE (100) in an encoded format.

Figure 4E:
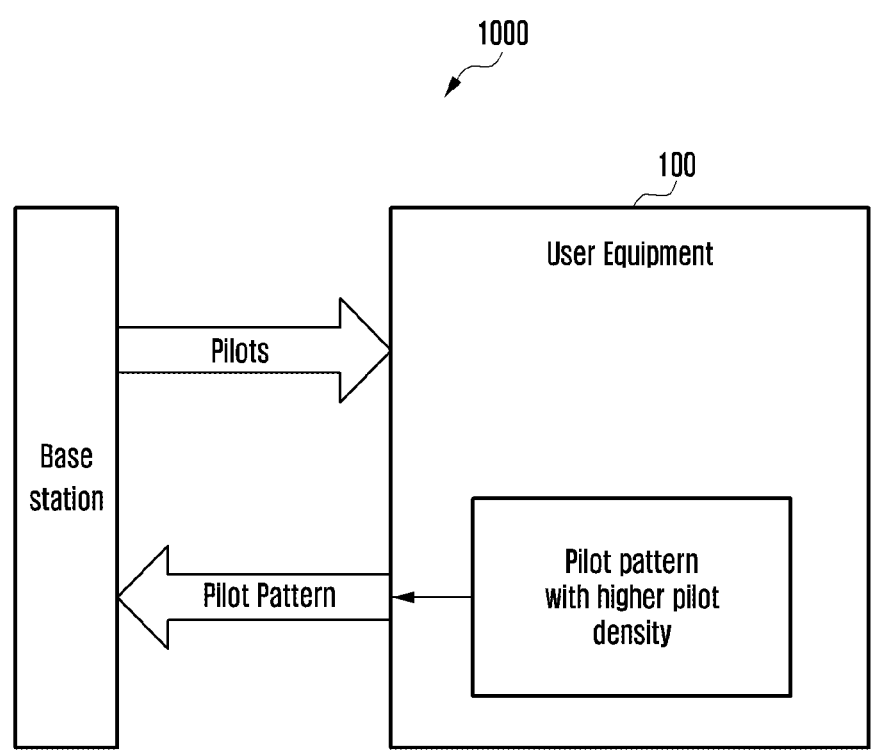
FIG. 4E is a diagram illustrating the wireless network for deep learning based optimal pilot pattern selection for the channel estimation when a pilot pattern for the channel parameters shared with the BS and current channel parameters are beyond threshold, according to various embodiments.

FIG. 4E is a diagram illustrating an example of the wireless network (1000) for the deep learning based optimal pilot pattern selection for the channel estimation when the pilot pattern for the channel parameters shared with the BS (200) and current channel parameters are beyond threshold, according to embodiments as disclosed herein. This scenario is when previous (time T) and current (time T+1) channel parameters are beyond the prefixed threshold. In this case, the UE (100) asks for more dense pilot pattern in case the channel parameter values are higher.

Figure 4F:
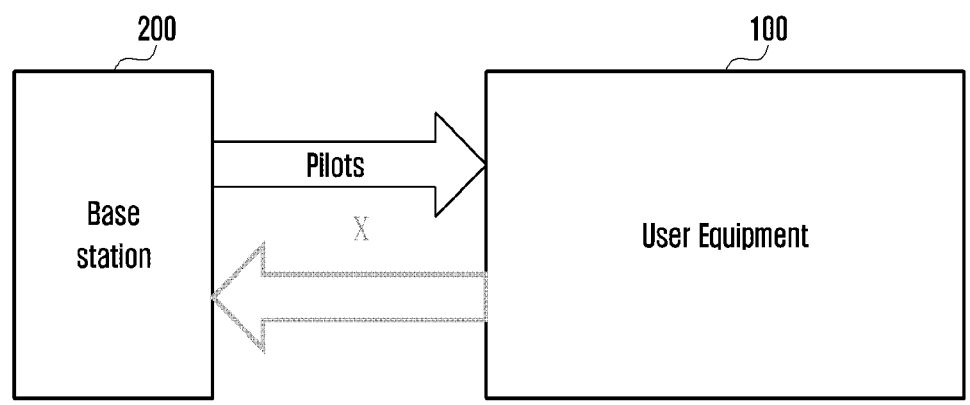
FIG. 4F is a diagram illustrating the wireless network for deep learning based optimal pilot pattern selection for the channel estimation when preceding and current channel parameters are within threshold and the best pilot pattern for these parameters is already communicated, according to various embodiments.

FIG. 4F is a diagram illustrating an example of the wireless network (1000) for deep learning based optimal pilot pattern selection for the channel estimation when preceding and current channel parameters are within threshold and the best pilot pattern for these parameters is already communicated, according to various embodiments. This scenario is when previous (time T) and current (time T+1) channel parameters are within a prefixed threshold and the pilot pattern is communicated apriori. No communication is required between the UE (100) and the BS (200).

Figure 5:
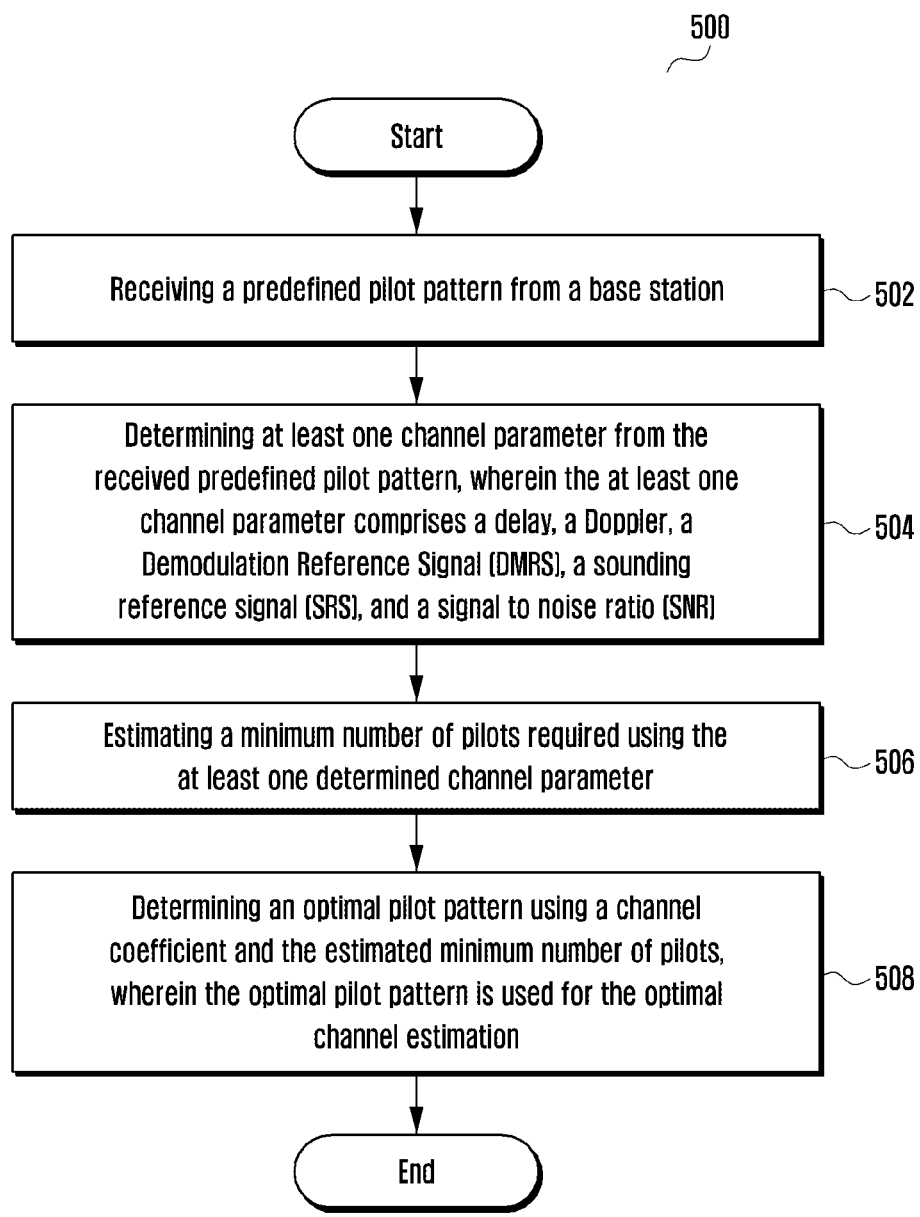
FIG. 5 is a flowchart illustrating an example method, implemented by the UE, for selecting a pilot pattern for an optimal channel estimation, according to various embodiments.

FIG. 5 is a flowchart (500) illustrating an example method, implemented by the UE (100), for selecting the pilot pattern for the optimal channel estimation, according to various embodiments. The operations (S502-S508) are handled by the optimal channel estimation controller (140).

At 502, the method includes receiving the predefined pilot pattern from the BS (200). At 504, the method includes determining the at least one channel parameter from the received predefined pilot pattern, where the channel parameter comprises the delay, the DMRS, the SRS, and the SNR. At 506, the method includes estimating the minimum number of pilots required using the at least one determined channel parameter. At 508, the method includes determining the optimal pilot pattern using the channel coefficient and the estimated minimum number of pilots. The optimal pilot pattern is used for the optimal channel estimation.

Figure 6:
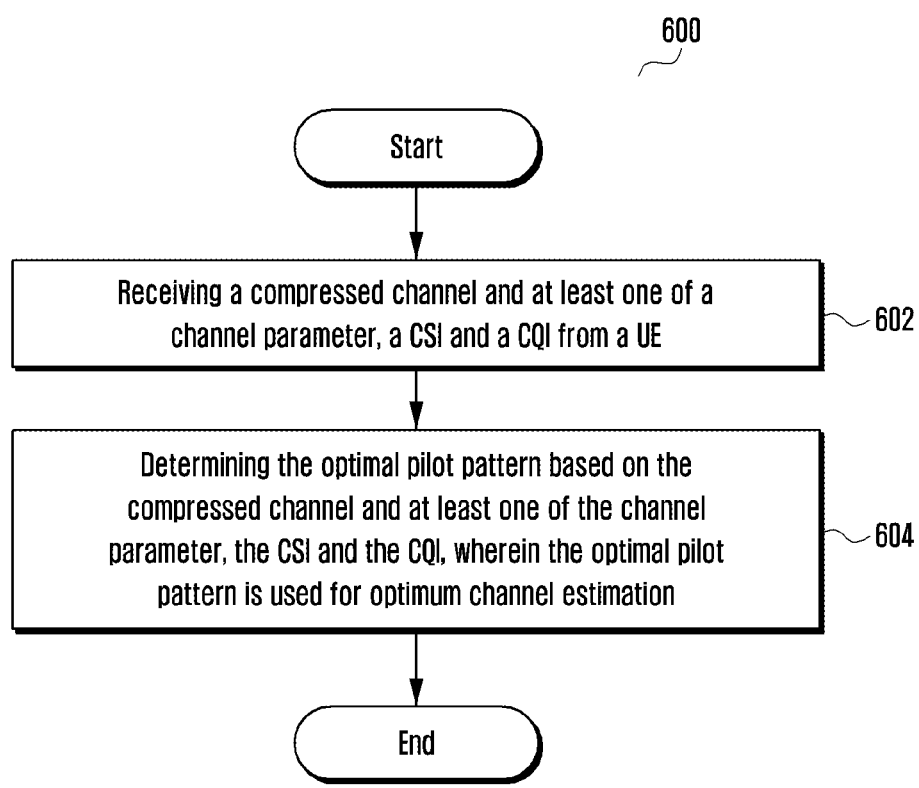
FIG. 6 is a flowchart illustrating an example method, implemented by the base station, for selecting the pilot pattern for the optimal channel estimation, according to various embodiments.

FIG. 6 is a flowchart (600) illustrating an example method, implemented, by the base station (200) for selecting the pilot pattern for the optimum channel estimation, according to various embodiments. The operations (602 and 604) are handled by the optimal channel estimation controller (240).

At 602, the method includes receiving the compressed channel and the at least one of a channel parameter, the CSI and the CQI from the UE (100). At 604, the method includes determining the optimal pilot pattern based on the compressed channel and at least one of the channel parameter, the CSI and the CQI, wherein the optimal pilot pattern is used for optimum channel estimation.

The method can be used to select the pilot pattern for the improved optimal channel estimation in the wireless network (1000) with less computation process and low cost. The method can be used to estimate the optimal pilot number and their respective positioning for better channel estimation resulting in higher throughput. This can be done either at the BS (200) or the UE (100) using uplink and downlink channels respectively using feature selection techniques.

FIG. 7 is a diagram illustrating an example optimal pilot number as the regression network (150), according to various embodiments. The regression network (150) obtains the optimal number of pilots that can be modelled as a regression problem. During inference, the regression network (150) can use a ceil function on an output to get an integer. Here, using the channel parameters and the error threshold, the regression network (150) can deduce the minimum number of pilots required. This network can be realized using various architectures (e.g., densely connected neural network (DNN) for performing the task. The regression network (150) receives the dataset. The dataset should include input and output pairs, where the input is a vector including channel parameters, acceptable error, and the number of continuous RBs and output is minimum number of pilots required. The detailed procedure for generating the dataset is given in the data generation slide later. The DNN is trained to minimize the error between the estimated minimum number of pilots required and the actual minimum number of pilots required. This network can be trained offline.

FIG. 8 is a diagram illustrating an example optimal pilot position using the feature selection network (160), according to various embodiments. The feature selection network (160) is designed to identify the most informative positions while discarding the redundant positions. Autoencoder based architectures in deep Learning have been shown to excel in the task of compression and feature selection. In the feature selection network (160), autoencoders include an encoder block (162) and a decoder block (164). The encoder block (162) converts a high dimension signal into low dimension and the decoder block (164) reconverts the lower dimension signal to the original dimension space. The autoencoders hence are trained such that the output of the network (160) should be same as the input. The objective of the autoenoders is to minimize the error between the output (estimated input) and the actual input.

Figure 9A:
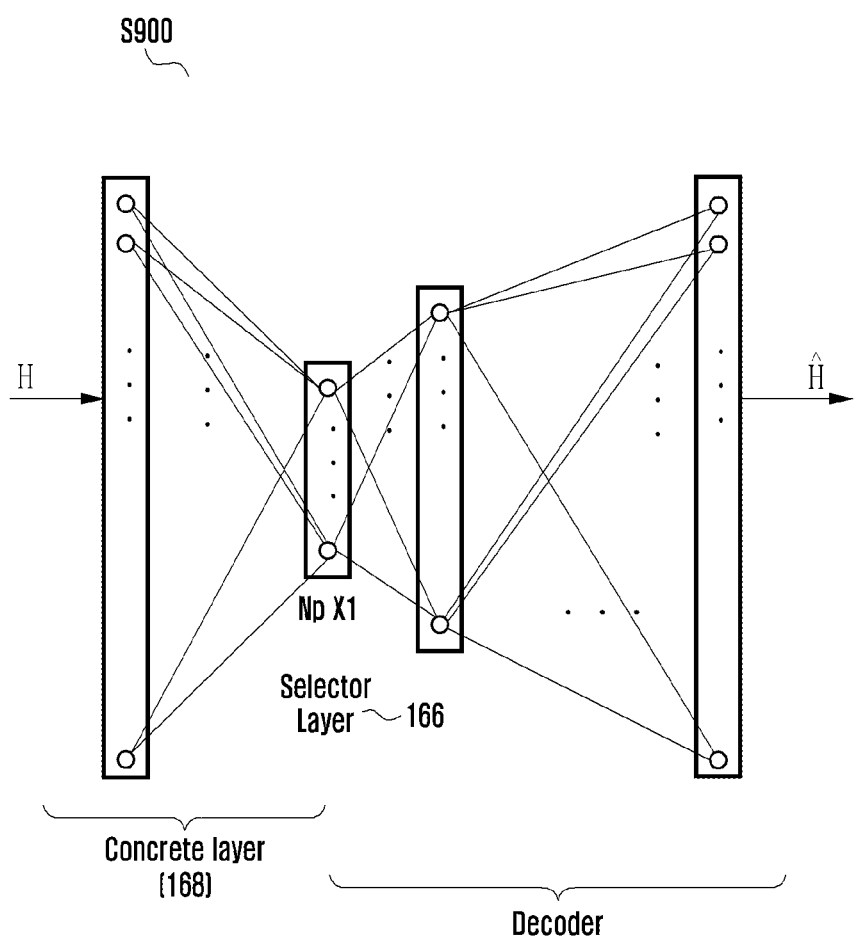
FIG. 9A and FIG. 9B are diagrams illustrating an example concrete autoencoder network, according to various embodiments.
Figure 9B:
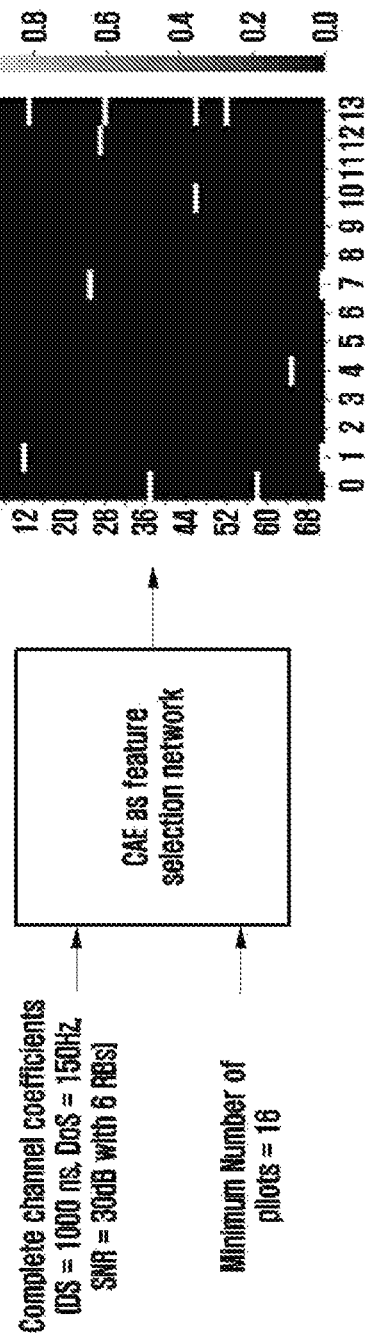

FIG. 9A and FIG. 9B are diagrams illustrating an example concrete autoencoder network (S900), according to various embodiments. For selection, the UE (100) needs to have the pilots at the end of the encoder block/layer (162). For this, the UE (100) uses a variation of autoencoder known as Concrete Autoencoder (CAE). In CAE, there will be a selector layer S (166) which generates stochastic linear combinations of input features. The number of nodes in this selector layer (166) is assigned as the optimal pilot number as estimated from the optimal pilot number NN previously. Let the $f_{Decoder}$ be the decoder function and S be the selector layer (166). The selector layer (166) is provided with a concrete layer (168), where the concrete layer (168) fine-tunes the output using the stochastic linear combinations of a selector. Then the network is trained to update the stochastic linear combinations of selector and the weights and biases of the decoder by minimizing the error between the ideal channel coefficients H and the decoder output $f_{Decoder}$ (S).

The dataset for the Optimal pilot number NN can be generated using the following operations:
1. The train the CAE for various channel parameters (input for CAE is the channel coefficients corresponding to these channel parameters) for different number of continuous RB and for various number of pilots at selection layer for each of the channel parameters.
2. After the CAE is trained, the user of the UE (100) can get the channel estimation error for different combinations of channel parameters and pilot numbers.
3. Using the data at our disposal now for various combinations, the user of the UE (100) generates the input and output vectors for training the optimal pilot number NN.
4. The input will be a vector including (Channel parameters (DS, DoS and SNR), estimation error, and no. of continuous RB) and the output is a number corresponding to the number of pilots used for the CAE.

The dataset for the feature selection network includes the complete channel coefficients and also requires the number of pilots.

Figure 10:
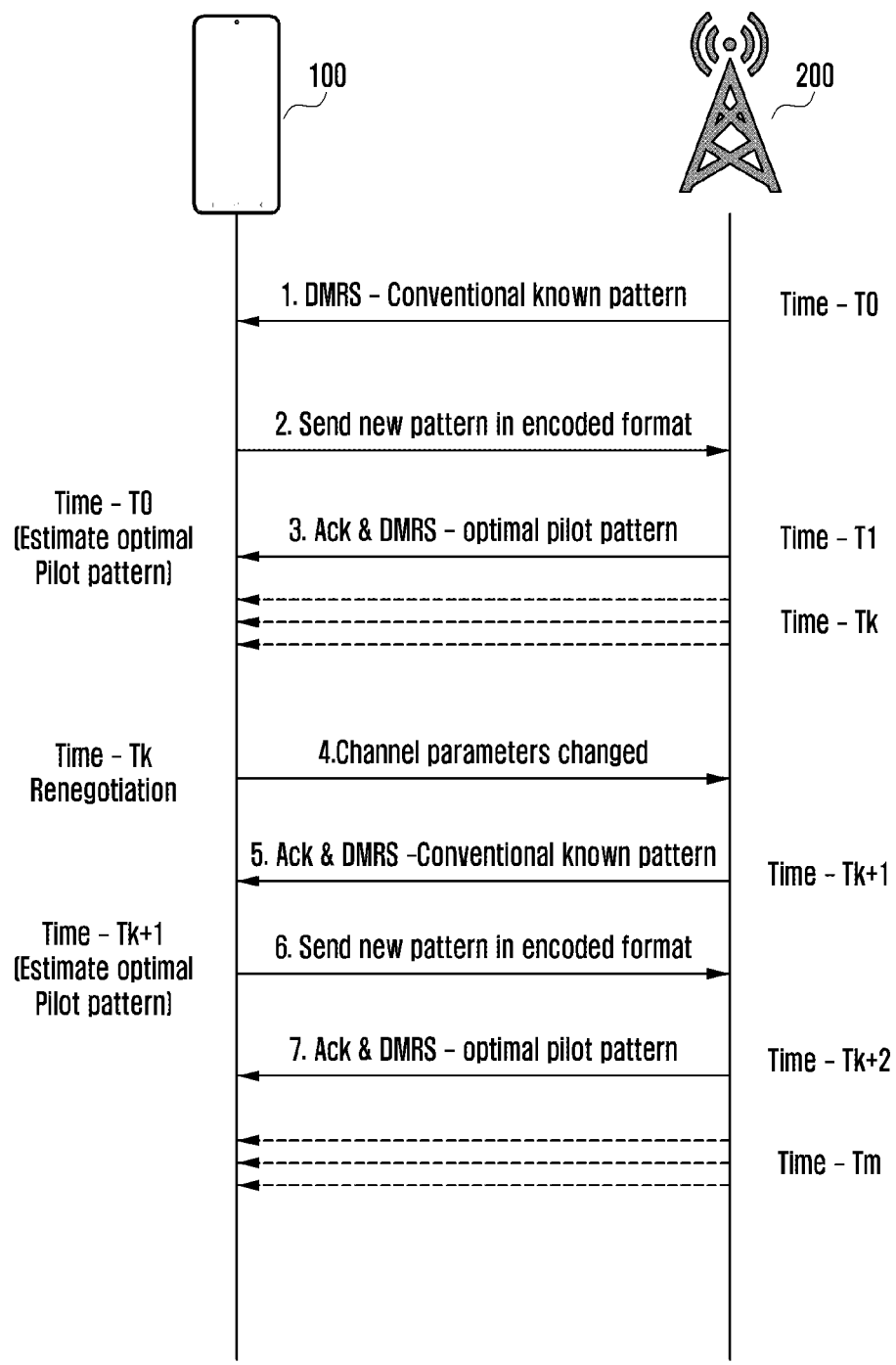
FIG. 10 is a sequence diagram illustrating an example of a deep learning based optimal pilot pattern selection for the channel estimation, according to various embodiments.

FIG. 10 is a sequence diagram illustrating an example of the deep learning based optimal pilot pattern selection for the channel estimation in the wireless network (1000), according to various embodiments.

Consider a scenario, where the channel parameters remain similar from time $T_0$ to $T_{k-1}$. The channel parameters are changed considerably from $T_{k-1}$ to $T_k$ and the channel parameters remain similar in the time period $T_k$ to $T_n$. Under this consideration the communication between the BS (200) and the UE (100) can be seen in FIG. 10.

Initiation: Initially at time $T_0$, at 1 the BS (200) sends the DMRS signal with conventional known pilot pattern to the UE (100). At 2, the UE (100) then estimates the optimal pilot pattern for the given channel parameters using the two networks (150 and 160) and sends back the optimal pilot pattern to the BS (200) in an encoded format.

Usage of best pilot pattern: At 3, the BS (200) acknowledges the received pilot pattern and sends the DMRS with optimal pilot pattern from $T_1$. As the UE (100) already has the appropriate decoder with it, it uses the same to estimate the channel more accurately. This continues till the channel parameters of the current instance and the instance when the optimal pattern is communicated, remain similar.

Interruption and renegotiation of optimal pilot pattern: when the channel parameters of the current instance ($T_k$) and the time instance when the optimal pattern is previously communicated (in this case $T_0$) are different (beyond a threshold), the UE (100) sends an interrupt signal to the BS (200) at 4. At 5, the BS (200) then acknowledges the same and send the DMRS using conventional known pattern in the next time instance $T_{k+1}$.

Repetitive cycle: the DMRS using conventional known pattern at the time $T_{k+1}$ is similar to the initiation step at time $T_0$. So, $T_{k+1}$ can be treated as new T0 and the process continues. Once the interrupt and renegotiation process has started, the steps of initiation, usage of best pilot pattern and interrupt and renegotiation process forms a repetitive cycle till the data is being transmitted between the BS (200) and the UE (100) at 6. The best pilot pattern (BPP) is estimated at the UE (100) and transmitted to the BS (200). This information sharing of best pilot pattern can be done in the encoded format, which can be of various types. One approach can be just sending the actual subcarrier and symbol number. Other can be sending the first position using actual and the remaining positions using differential subcarrier and symbol numbers. At 7, the BS (200) acknowledges the received pilot pattern and sends the DMRS with optimal pilot pattern from $T_{1+2}$.

Figure 11:
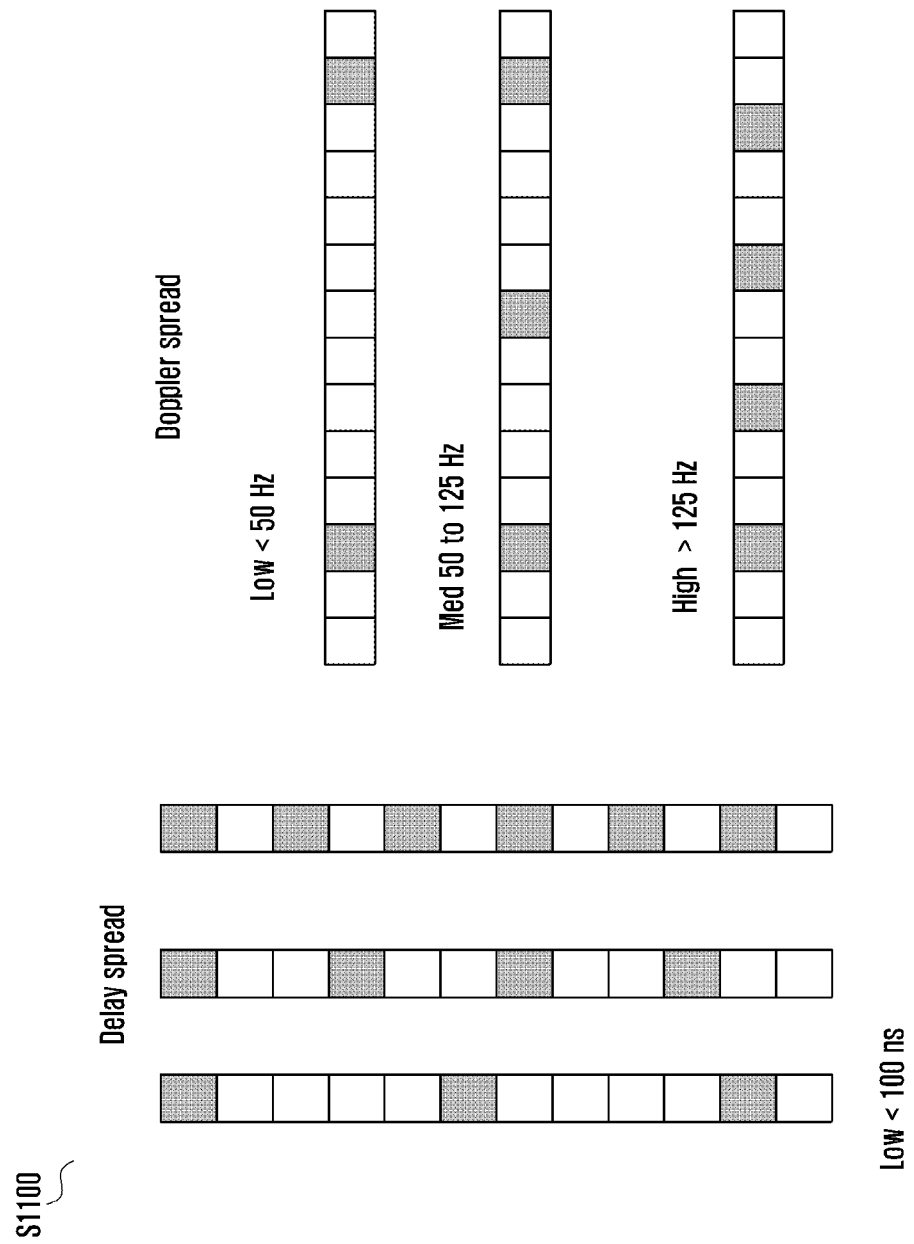
FIG. 11 is a diagram illustrating example best pilot patterns for various channel parameters, which are obtained using offline training with a fixed error threshold, according to various embodiments.

FIG. 11 is a diagram illustrating example (S1100) best pilot patterns for various channel parameters, which are obtained using offline training with a fixed error threshold, according to various. Referring to FIG. 11, the best pilot patterns (e.g., optimal number of pilots and their respective positions) for various channel parameters are stored, which are obtained using an offline training with the fixed error threshold. The first the channel parameters are estimated. The best pilot pattern (from stored patterns) is picked using nearest neighbour of current channel parameters and is communicated back to the BS (200).

Figure 12:
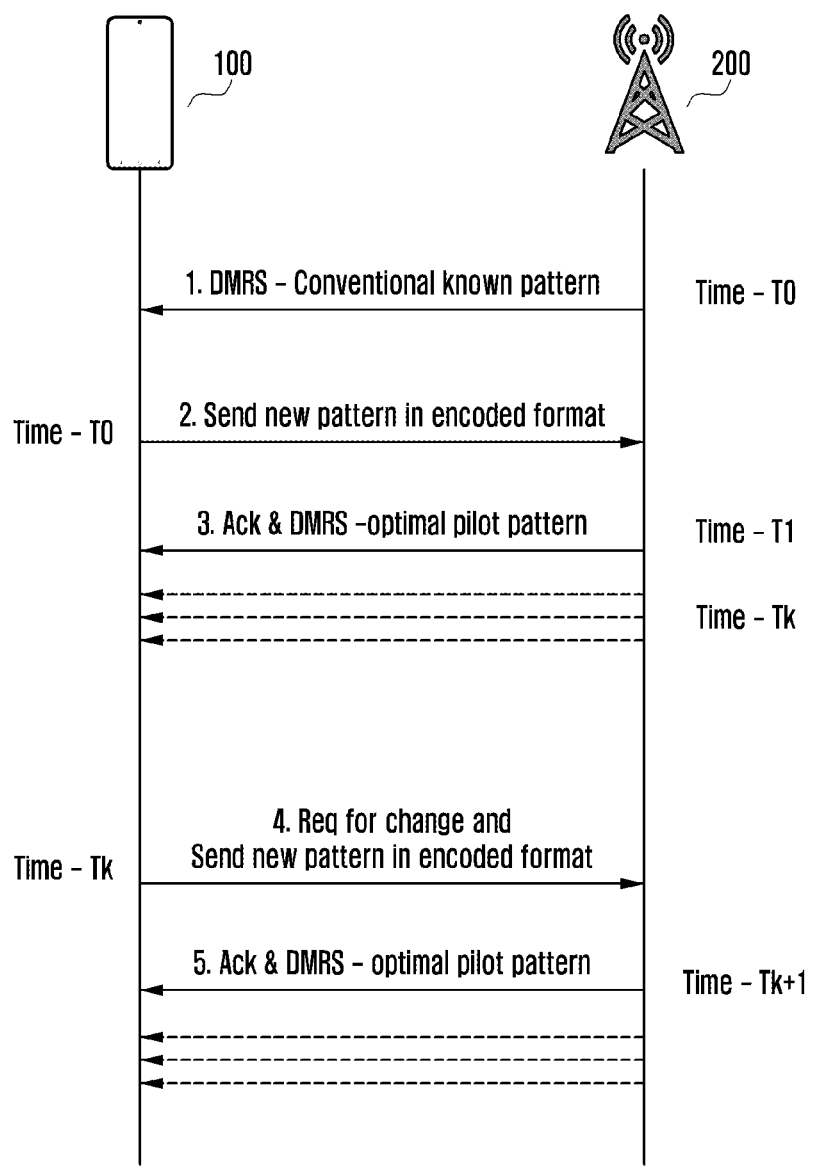
FIGS. 12, 13 and 14 are sequence diagrams illustrating examples of a deep learning based optimal pilot pattern selection for the channel estimation, according to various embodiments as disclosed herein.
Figure 13:
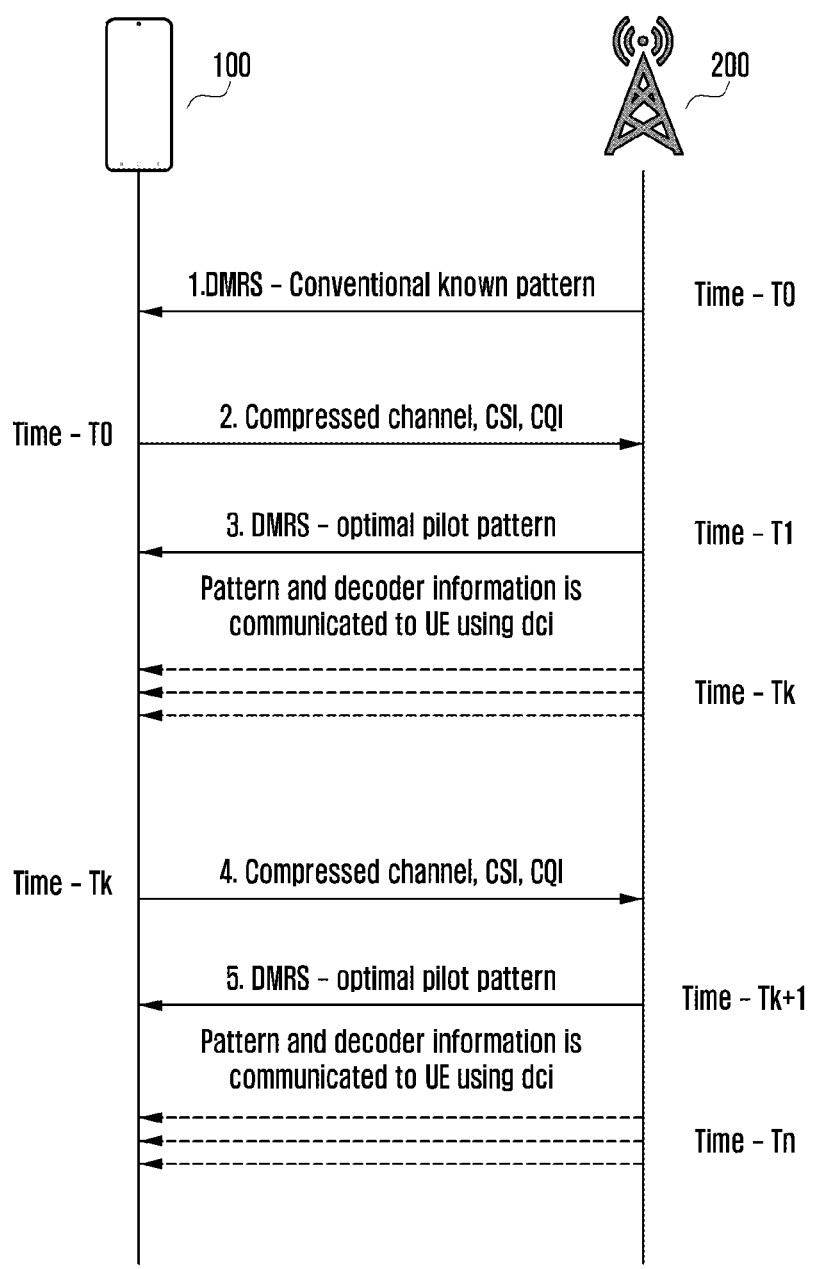
Figure 14:
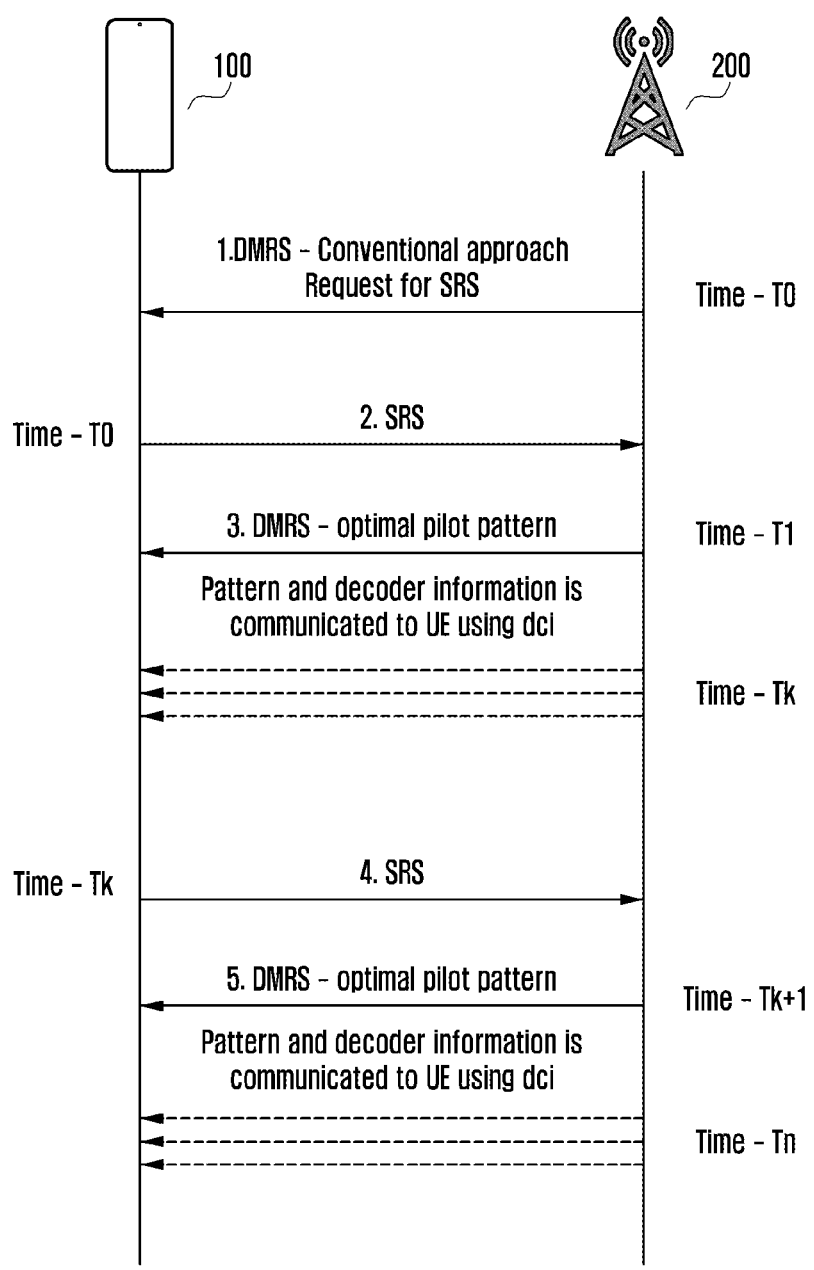

FIGS. 12, 13 and 14 are sequence diagrams illustrating examples of the deep learning based optimal pilot pattern selection for the channel estimation, according to various embodiments.

Referring to FIG. 12, consider a scenario, the channel parameters remain similar from time $T_0$ to $T_{k-1}$, the channel parameters are changed considerably from $T_{k-1}$ to $T_k$ and the channel parameters remain similar in the time period $T_k$ to $T_n$. Under this consideration the communication between the BS (200) and the UE (100) can be seen in FIG. 12. In this approach, the UE (100) would have precomputed the optimal pilot pattern for different channel parameters apriori. Initially, at time $T_0$, the BS (200) sends the DMRS signal with conventional known pilot pattern to the UE (100) at 1. The UE (100) then finds the nearest neighbour of the current channel parameters and obtains the optimal pilot pattern of that nearest neighbour and communicates it back to the BS (200) at 2.

At 3, usage of best pilot pattern, the BS (200) acknowledges the received pilot pattern and sends the DMRS with optimal pilot pattern from $T_1$. As, the UE (100) already has the appropriate decoder of the nearest neighbour with it, it uses the same to estimate the channel resulting in better channel estimation.

At 4, the UE (100) continues to estimate the nearest neighbour for every following time instance. When the current instance's ($T_k$) channel parameters nearest neighbour is different from the previous instance ($T_{k-1}$), the UE (100) requests for the change in the pilot pattern being used and send the optimal pilot pattern based on the nearest neighbour of channel parameters at time instance ($T_k$).

At 5, the BS (200) acknowledges the received pilot pattern and sends the DMRS with the new optimal pilot pattern from next instance $T_{k+1}$. This pattern will be in use until the UE (100) finds a different nearest neighbour and initiates the request for change in the pilot pattern being used.

In FIG. 12, the best pilot pattern (BPP) is estimated at the UE (100) and transmitted to the BS (200). This information transmission can be done in the encoded format. As the number of different patterns stored will be limited in number, the user of the UE (100) can assign a code for each of them based on the number of patterns and communicate the appropriate pattern to be used to the BS (200) from the UE (100).

As shown in FIG. 13, at 1, the channel is estimated at the UE (100). At 2, the compressed channel is sent along with channel parameters, the CSI and the CQI to the BS (200) from the UE (100). At 3, the best pilot pattern is the computed at the BS (200). At 4, the BS (200) then sends the pilots in the new pattern to the UE (100) from next time instance by providing the new pilot pattern and decoder information to be used at the UE (100) in the DCI in the encoded format. At 5, when the estimation error at the UE (100) becomes high (detected by decrease in throughput), the UE (100) sends the compressed channel, the CSI and the CQI to the BS (200) and steps 3 and 4 follows it. Consider a scenario, where the channel parameters remain similar from time $T_0$ to $T_{k-1}$, the channel parameters are changed considerably from $T_{k-1}$ to $T_k$ and channel parameters remain similar in the time period $T_k$ to $T_n$.

Consider a scenario, where the channel parameters remain similar from time $T_0$ to $T_{k-1}$, the channel parameters are changed considerably from $T_{k-1}$ to $T_k$, and the channel parameters remain similar in the time period $T_k$ to $T_n$.

As shown in FIG. 14, at 1, the BS (200) requests the UE (100) to send sounding reference signal (SRS). At 2, the UE (100) sends the SRS to the BS (200). At 3, based on the received SRS and the channel reciprocity, the best pilot pattern is computed at the BS (200). At 4, the BS (200) then sends the pilots in the new pattern to the UE (100) from next time instance by providing the new pilot pattern and decoder to be used at the UE (100) in the DCI in the encoded format. At 5, when the estimation error at the UE (100) becomes high (detected by decrease in throughput), the UE (100) sends the SRS to BS (200) and steps 3 and 4 follows it. Consider a scenario, where the channel parameters remain similar from time $T_0$ to $T_{k-1}$, the channel parameters are changed considerably from $T_{k-1}$ to $T_k$ and the channel parameters remain similar in the time period $T_k$ to $T_n$.

As shown in FIG. 13 and FIG. 14, the UE (100) requires the decoder information for the channel estimation.

In order to obtain the decoder information, in an embodiment, the BS (200) sends the decoder parameters to the UE (100) along with the pilot pattern. In another embodiment, the UE (100) contains the fixed set of decoders for different pilot patterns and the BS (200) communicates to the UE (100) about which decoder to be used.

Figure 15:
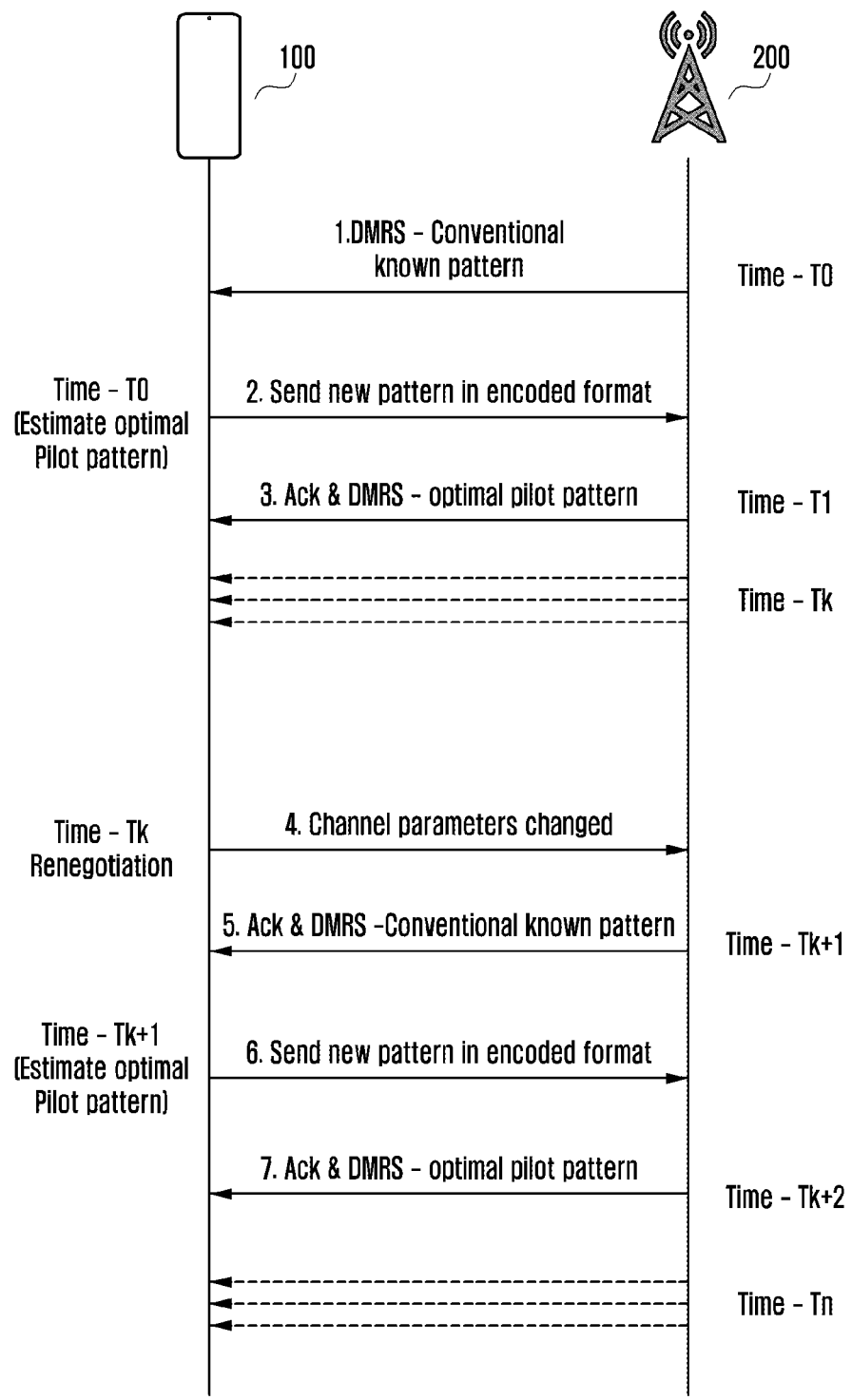
FIG. 15 is a sequence diagram illustrating an example of the deep learning based optimal pilot pattern selection for the channel estimation during an uplink communication, according to various embodiments.

FIG. 15 is a sequence diagram illustrating an example of the deep learning based optimal pilot pattern selection for the channel estimation during an uplink communication, according to various embodiments.

Consider a scenario, where the channel parameters remain similar from time $T_0$ to $T_{k-1}$, the channel parameters are changed considerably from $T_{k-1}$ to $T_k$ and the channel parameters remain similar in the time period $T_k$ to $T_n$. Under this consideration, the communication between the BS (200) and the UE (100) can be seen in FIG. 15.

At 1, initially at time $T_0$, the UE (100) sends the DMRS signal with conventional known pilot pattern to the BS (200). At 2, the BS (200) then estimates the optimal pilot pattern for the given channel parameters using the two networks (150 and 160) and sends back the optimal pilot pattern to the UE (100) in an encoded format.

At 3, the UE (100) acknowledges the received pilot pattern and sends the DMRS with optimal pilot pattern from $T_1$. As the BS (200) already has the appropriate decoder with it, it uses the same to estimate the channel more accurately. This continues till the channel parameters of the current instance and the instance when the optimal pattern is communicated, remain similar.

At 4, when the channel parameters of the current instance ($T_k$) and the time instance when the optimal pattern is previously communicated (in this case $T_0$) are different (beyond a threshold), the BS (200) sends an interrupt signal to the UE (100). At 5, the UE (100) then acknowledges the same and send the DMRS using conventional known pattern in the next time instance $T_{k+1}$ The DMRS using the conventional known pattern at the time $T_{k+1}$ is similar to the initiation step at time $T_0$. So, $T_{k+1}$ can be treated as new $T_0$ and the process continues. Once the interrupt and renegotiation process has started, the steps of initiation, usage of best pilot pattern and interrupt and renegotiation process forms a repetitive cycle till the data is being transmitted from the UE (100) to the BS (200).

At 6, the best pilot pattern (BPP) is estimated at the BS (200) and transmitted to the UE (100). This information sharing of best pilot pattern can be done in the encoded format, which can be of various types such as one approach can be just sending the actual subcarrier and the symbol number and Other can be sending the first position using actual and the remaining positions using differential subcarrier and symbol numbers. At 7, the UE (100) acknowledges the received pilot pattern and sends the DMRS with optimal pilot pattern from $T_{k+2}$. The process explained in FIG. 15 is similarly applied to FIG. 10 and FIG. 12-FIG. 14.

The various actions, acts, blocks, operations, or the like in the flowcharts (500 and 600) may be performed in the order presented, in a different order or simultaneously. Further, in various embodiments, some of the actions, acts, blocks, operations, or the like may be omitted, added, modified, skipped, or the like without departing from the scope of the disclosure.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for selecting a pilot pattern for an optimal channel estimation in a wireless network, the method comprising:
   receiving, by a User Equipment (UE), a specified pilot pattern from a base station (BS);
   determining, by the UE, at least one channel parameter from the received specified pilot pattern;
   estimating, by the UE, a minimum number of pilots required using the at least one determined channel parameter; and
   determining, by the UE, an optimal pilot pattern using a channel coefficient and the estimated minimum number of pilots, wherein the optimal pilot pattern is used for the optimal channel estimation in the wireless network.

2. The method as claimed in claim 1, further comprising:
   identifying, by the UE, a position of a pilot in the optimal pilot pattern based on the computed channel parameter, the estimated minimum number of pilots, and an acceptable error threshold value; and
   transmitting, by the UE, the optimal pilot pattern and the position of the pilot in the optimal pilot pattern to the BS.

3. The method as claimed in claim 2, wherein transmitting the optimal pilot pattern to the BS comprises:
   performing, by the UE, one of:
      transmitting an actual subcarrier and a symbol number to the BS, and
      transmitting a first position using actual subcarrier and symbol number, and remaining positions using differential subcarrier and symbol numbers to the BS.

4. The method as claimed in claim 2, wherein the position of the pilot is determined using a feature selection network, wherein the feature selection network is configured to receive the minimum number of pilots and channel coefficients to determine the position of the pilot, wherein the feature selection network comprises:
   an encoder block configured to convert a high dimension signal into a low dimension signal;
   a decoder block configured to reconvert the lower dimension signal to the high dimension signal; and
   a selector layer configured to generate stochastic linear combinations of input features received at the encoder block, wherein the feature selection network is trained to update the stochastic linear combinations of the selector layer and weights and biases of the decoder block by minimizing an error between ideal channel coefficients and a decoder output.

5. The method as claimed in claim 1, further comprising:
   determining, by the UE, whether a number of continuous resource blocks (RBs) used for communication by the BS is identified apriori; and
   performing, by the UE, one of:
      transmitting the optimal pilot pattern for the fixed number of RBs upon determining the number of continuous RBs used for communication by the BS is identified apriori, and
      transmitting multiple patterns with different RB setup to the BS upon determining the number of continuous RBs used for communication by the BS is not identified apriori.

6. The method as claimed in claim 1, further comprising:
   receiving, by the UE, at least one another channel parameter;
   determining, by the UE, whether at least one another channel parameter and the at least one channel parameter are the same, wherein the at least one channel parameter is received at a first time period and the at least one another channel parameter is received at a second time period, wherein the first time period and the second time period are different; and
   performing, by the UE, one of:
      using the optimal pilot pattern for the channel estimation upon determining that at least one another channel parameter and the at least one channel parameter are same, and
      repeating estimating the minimum number of pilots required using the at least one another channel parameter, selecting another optimal pilot pattern using the channel coefficient and the estimated minimum number of pilots, and transmitting the optimal pilot pattern to the BS upon determining that at least one another channel parameter and the at least one channel parameter are different.

7. The method as claimed in claim 1, wherein an optimal number of pilots is determined using a regression network, wherein the regression network is configured to receive the at least one channel parameter, an acceptable error threshold value, and a number of continuous RBs to determine the optimal number of pilots, wherein the optimal pilot pattern is determined using nearest neighbor of the channel parameter.

8. The method as claimed in claim 1, wherein the optimal pilot pattern and the position of the pilot in the optimal pilot pattern is transmitted in an encoded format, wherein the UE requires at least one decoder information for the channel estimation, wherein the at least one channel parameter comprises a delay, a Doppler, and a signal to noise ratio (SNR).

9. A User Equipment (UE) configured to select a pilot pattern for an optimal channel estimation in a wireless network, comprising:
   a processor;
   a memory; and
   an optimal channel estimation controller, coupled with the processor and the memory, the optimal channel estimation controller configured to:
      receive a specified pilot pattern from a base station (BS);
      determine at least one channel parameter from the received specified pilot pattern;
      estimate a minimum number of pilots required using the at least one determined channel parameter; and
      determine an optimal pilot pattern using a channel coefficient and the estimated minimum number of pilots, wherein the optimal pilot pattern is used for the optimal channel estimation.

10. The UE as claimed in claim 9, wherein the optimal channel estimation controller is further configured to:

identify a position of a pilot in the optimal pilot pattern based on the computed channel parameter, the estimated minimum number of pilots, and an acceptable error threshold value; and transmit the optimal pilot pattern and the position of the pilot in the optimal pilot pattern to the BS.

11. The UE as claimed in claim 10, wherein transmit the optimal pilot pattern to the BS further configured to:
perform one of:
transmitting an actual subcarrier and a symbol number to the BS, and
transmitting a first position using actual subcarrier and symbol number, and remaining positions using differential subcarrier and symbol numbers to the BS.

12. The UE as claimed in claim 10, wherein the position of the pilot is determined using a feature selection network, wherein the feature selection network is configured to receive the minimum number of pilots and channel coefficients to determine the position of the pilot, wherein the feature selection network comprises:
an encoder block configured to convert a high dimension signal into a low dimension signal;
a decoder block configured to reconvert the lower dimension signal to the high dimension signal; and
a selector layer configured to generate a stochastic linear combinations of input features received at the encoder block, wherein the feature selection network is trained to update the stochastic linear combinations of the selector layer and weights and biases of the decoder block by minimizing an error between ideal channel coefficients and a decoder output.

13. The UE as claimed in claim 9, wherein the optimal channel estimation controller is further configured to:
determine whether a number of continuous resource blocks (RBs) used for communication by the BS is identified apriori; and
perform one of:
transmitting the optimal pilot pattern for the fixed number of RBs upon determining the number of continuous RBs used for communication by the BS is identified apriori, and transmit multiple patterns with different RB setup to the BS upon determining the number of continuous RBs used for communication by the BS is not identified apriori.

14. The UE as claimed in claim 9, wherein the optimal channel estimation controller is further configured to:
receive at least one another channel parameter;
determine whether at least one another channel parameter and the at least one channel parameter are the same, wherein the at least one channel parameter is received at a first time period and the at least one another channel parameter is received at a second time period, wherein the first time period and the second time period are different; and
perform one of:
using the optimal pilot pattern for the channel estimation upon determining that at least one another channel parameter and the at least one channel parameter are same, and
repeating estimating the minimum number of pilots required using the at least one another channel parameter, selecting another optimal pilot pattern using the channel coefficient and the estimated minimum number of pilots, and transmitting the optimal pilot pattern to the BS upon determining that at least one another channel parameter and the at least one channel parameter are different.

15. The UE as claimed in claim 9, wherein the optimal number of pilots is determined using a regression network, wherein the regression network is configured to receive the at least one channel parameters, an acceptable error threshold value, and a number of continuous RBs to determine the optimal number of pilots, wherein the optimal pilot pattern is determined using nearest neighbor of the channel parameter.

16. The UE as claimed in claim 9, wherein the optimal pilot pattern and the position of the pilot in the optimal pilot pattern is transmitted in an encoded format, wherein the UE requires at least one decoder information for the channel estimation, wherein the at least one channel parameter comprises a delay, a Doppler, and a signal to noise ratio (SNR).

* * * * *